(12) United States Patent
Pan et al.

(10) Patent No.: US 10,697,143 B2
(45) Date of Patent: Jun. 30, 2020

(54) INFLATABLE DAM AND METHOD THEREOF

(71) Applicant: HTE Engineering LLC, Sandy, UT (US)

(72) Inventors: Dong Pan, Sandy, UT (US); David Sanders, West Jordan, UT (US)

(73) Assignee: HTE Engineering LLC, Sandy, UT (US)

(*) Notice: Subject to any disclaimer, the term of this patent is extended or adjusted under 35 U.S.C. 154(b) by 0 days.

(21) Appl. No.: 16/373,572

(22) Filed: Apr. 2, 2019

(65) Prior Publication Data

US 2019/0284775 A1 Sep. 19, 2019

Related U.S. Application Data

(63) Continuation-in-part of application No. 15/853,187, filed on Dec. 22, 2017, now Pat. No. 10,273,645.

(60) Provisional application No. 62/438,347, filed on Dec. 22, 2016.

(51) Int. Cl.
*E02B 3/10* (2006.01)
*E04H 9/14* (2006.01)
*E02B 7/00* (2006.01)

(52) U.S. Cl.
CPC .............. *E02B 3/102* (2013.01); *E02B 7/005* (2013.01); *E04H 9/145* (2013.01)

(58) Field of Classification Search
CPC combination set(s) only.
See application file for complete search history.

(56) References Cited

U.S. PATENT DOCUMENTS

| | | | |
|---|---|---|---|
| 1,561,759 A | 11/1925 | Wetmore | |
| 3,067,712 A | 12/1962 | Doerpinghaus | |
| 3,173,269 A | 3/1965 | Imbertson | |
| 3,355,851 A | 12/1967 | Imbertson et al. | |
| 3,496,686 A | 2/1970 | Bird | |
| 3,855,800 A * | 12/1974 | Ganzinotti | E02B 7/005 405/91 |
| 4,299,514 A | 11/1981 | Muramatsu et al. | |
| 4,318,634 A | 3/1982 | Borca | |
| 4,352,591 A | 10/1982 | Thompson | |
| 4,661,015 A | 4/1987 | Tsuji et al. | |
| 4,728,221 A | 3/1988 | Tsuji et al. | |
| 4,781,493 A * | 11/1988 | Fischer | E02B 15/08 405/63 |
| 4,787,774 A | 11/1988 | Grove | |

(Continued)

*Primary Examiner* — Kyle Armstrong
(74) *Attorney, Agent, or Firm* — David L. Stott

(57) ABSTRACT

Embodiments of an inflatable dam sized to be secured to a foundation structure with an anchor line. The inflatable dam includes a main bladder and an overlapping layer. The main bladder is moveable between deflated and inflated states such that, in the inflated state, the main bladder extends with a tubular configuration. The overlapping layer is sized and configured to extend over a portion of the main bladder and, in the inflated state, concentrically aligned with the portion of the main bladder. The overlapping layer is sized to extend with an overlapping length and to extend laterally between a first end portion and a second end portion along the overlapping length, the first end portion being coupled to the fin structure and the second end portion being configured to be coupled to the anchor line and the foundation structure.

20 Claims, 20 Drawing Sheets

(56) References Cited

U.S. PATENT DOCUMENTS

| | | | |
|---|---|---|---|
| 4,906,134 A | | 3/1990 | Hoyeck |
| 4,909,666 A | * | 3/1990 | Takasaki ................. E02B 7/005 405/107 |
| 5,046,289 A | | 9/1991 | Bengel et al. |
| 5,205,886 A | | 4/1993 | White |
| 5,257,968 A | | 11/1993 | Caldwell |
| 5,261,869 A | | 11/1993 | Caldwell et al. |
| 5,354,255 A | | 10/1994 | Shapiro |
| 5,388,928 A | * | 2/1995 | Kumagai ................. E02B 7/005 405/115 |
| 5,538,360 A | | 7/1996 | Obermeyer |
| 5,833,387 A | | 11/1998 | Tackney |
| 6,179,521 B1 | | 1/2001 | Muramatsu et al. |
| 6,354,762 B1 | | 3/2002 | Muramatsu |
| 6,467,999 B2 | | 10/2002 | Muramatsu et al. |
| 6,481,928 B1 | | 11/2002 | Doolaege |
| 6,485,230 B2 | | 11/2002 | Robinson |
| 6,546,723 B1 | | 4/2003 | Watten et al. |
| 6,565,284 B2 | | 5/2003 | Gearhart |
| 6,609,854 B2 | | 8/2003 | Okazaki |
| 6,886,407 B1 | | 5/2005 | Fredenberg |
| 6,960,181 B2 | | 11/2005 | Stevens |
| 7,114,879 B2 | | 10/2006 | Obermeyer |
| 7,670,083 B2 | | 3/2010 | McWha |
| 7,708,495 B1 | | 5/2010 | Antee |
| 7,989,973 B2 | | 8/2011 | Birkestrand |
| 8,511,937 B2 | | 8/2013 | Obermeyer et al. |
| 9,028,170 B2 | | 5/2015 | Obermeyer et al. |
| 9,157,226 B2 | | 10/2015 | Hassett |
| 9,217,233 B2 | | 12/2015 | Behm et al. |
| 9,297,136 B2 | | 3/2016 | Lee et al. |

* cited by examiner

INFLATABLE DAM AND METHOD THEREOF

CROSS-REFERENCE TO RELATED APPLICATION

The present application is a continuation-in-part of U.S. patent application Ser. No. 15/853,187, filed on Dec. 22, 2017, which claims the benefit of U.S. Provisional Patent Application Ser. No. 62/438,347, filed Dec. 22, 2016, entitled INFLATABLE DAM AND METHOD THEREOF, the disclosures of which are incorporated by reference herein in their entirety.

TECHNICAL FIELD

The present invention relates generally to an apparatus for blocking the flow of water and, more specifically, the present invention relates to inflatable type dams for blocking the flow of water.

BACKGROUND

Dams and gate structures of a permanent nature typically made of cement and mortar to block or partially block the flow of water have been employed for ages. In the last several decades, collapsible or inflatable dams have been designed and employed for certain water way systems. These inflatable dams are typically made of a rubber membrane and secured to a reinforced concrete foundation and are far less costly than the cement and mortar permanent dams. Similar to the more conventional permanent dams, inflatable dams may be used for a wide variety of applications, such as irrigation, water storage, power generation, flood prevention and control, erosion control, groundwater recharge, tidal barriers, navigation, sewage treatment, etc.

The advantages of rubber dams over the more conventional permanent dam structures include considerable savings on cost of construction materials, simplified and more time efficient construction and installation, lower operation and maintenance costs, more simplified and low cost operating systems, readily deflatable to pass high flows without any obstruction, and high pressure compressors are not needed to run the dam system. Further, rubber dams are more reliable relative to leaking seals and work well in cold temperatures without the need to de-ice and do not have issues of jamming mechanical parts. Furthermore, lubrication of moving parts is not necessary and painting components for environmental protection is not required. In addition, rubber dams can readily adapt to potential differential settlement of the foundation and can easily absorb impacts, shocks, and vibrations.

However, due to the inflatable structure of rubber dams, the rubber membranes are relatively thin, making them susceptible to punctures due to potential sharp passing debris flowing over the dam or even sharp objects of vandalism. Fire damage to rubber dams can also be a potential problem due to rubber dams often being located where transients may be endeavoring to stay warm. Further, it is often necessary to deflate and drive over a rubber dam to move debris in areas otherwise unreachable, but such driving over the rubber dam often results in weakening the structural integrity of the rubber dam. As such, it would be advantageous to provide an inflatable rubber dam that will be less susceptible to sharp objects, fire damage and/or will facilitate safely driving over the rubber dam.

BRIEF SUMMARY OF THE INVENTION

The present invention is directed to an inflatable dam for securing to a foundation structure with an anchor line. In one embodiment, the inflatable dam includes an elongated main bladder and an overlapping layer. The main bladder is configured to be positioned along a horizontally extending foundation and between upward extending walls of the foundation. The main bladder is moveable between a deflated state and an inflated state such that, in the deflated state, the elongated main bladder extends in a substantially flat configuration and, in the inflated state, the main bladder extends in a substantially tubular configuration with a fin structure extending along an upper side and along a length of the main bladder. The overlapping layer is sized and configured to extend over a portion of the main bladder and, in the inflated state, concentrically aligned with the main bladder. The overlapping layer is sized to extend with an overlapping length and to extend laterally between a first end portion and a second end portion along the overlapping length, the first end portion being coupled to the fin structure and the second end portion being configured to be coupled to the anchor line and the foundation.

In another embodiment, the first end portion of the overlapping layer is integrally formed with the fin structure of the main bladder. In another embodiment, the first end portion of the overlapping layer is coupled to the fin structure of the main bladder with a clamp structure. In still another embodiment, the overlapping layer extends with an intermediate portion between the first end portion and the second end portion along the overlapping length, the intermediate portion overlying the main bladder in a non-coupled manner.

In another embodiment, the overlapping layer includes a first reinforcement element and a second reinforcement element, each of the first and second reinforcement elements being embedded in the overlapping layer. In a further embodiment, the first reinforcement element includes a woven fabric. In another further embodiment, the second reinforcement element includes a ceramic chip layer. In another embodiment, the overlapping layer includes a rubber material with a fire retardant or fire resistant component embedded within the rubber material. In still another embodiment, the overlapping layer includes marking indicia visible on an external surface of the overlapping layer.

In accordance with another embodiment of the present invention, an inflatable dam for securing to a foundation with an anchor line. The inflatable dam includes an elongated main bladder and an overlapping layer. The elongated main bladder is configured to be positioned and secured to the foundation. The elongated main bladder is moveable between a deflated state and an inflated state such that, in the inflated state, the main bladder extends in a substantially tubular configuration. The elongated main bladder extends with a first portion and a second portion each with an elongated length and a width. The first portion and the second portion are bondedly coupled at corresponding end portions thereof along the elongated length to form a fin structure such that, in the inflated state, the fin structure extends along the upper side of the elongated length of the main bladder. The overlapping layer is sized and configured to extend over the first portion of the main bladder and, in the inflated state, concentrically aligned with the first portion of the main bladder. The overlapping layer extends laterally over the first portion of the main bladder between a first end portion and a second end portion, the first end portion of the overlapping layer being coupled to the fin structure along the elongated length of the main bladder and the second end portion being configured to be coupled to the anchor line and the foundation.

In another embodiment, the first end portion of the overlapping layer is integrally formed with the fin structure of the main bladder. In another embodiment, the first end portion of the overlapping layer is coupled to the fin structure of the main bladder with a clamp structure. In yet another embodiment, the overlapping layer extends with an intermediate portion between the first end portion and the second end portion, the intermediate portion of the overlapping layer being a separate and discrete structure relative to the main bladder.

In another embodiment, the overlapping layer includes a first reinforcement element and a second reinforcement element, each of the first and second reinforcement elements being embedded in the overlapping layer. In a further embodiment, the first reinforcement element includes a woven fabric. In a further embodiment, the second reinforcement element includes a ceramic chip layer. In another embodiment, the overlapping layer includes a rubber material with a fire retardant or fire resistant component embedded within the rubber material. In another embodiment, the overlapping layer includes marking indicia visible on an external surface of the overlapping layer.

In accordance with another embodiment of the present invention, a method for limiting damage to an inflatable dam secured to a foundation structure is provided. In one embodiment, the method steps include: deflating a main bladder of an inflatable dam secured to a foundation structure such that, in a deflated state, the main bladder extends substantially flat against the foundation structure, the main bladder having a fin structure extending along one side of a length of the main bladder; positioning an overlapping layer over an upward facing side of the main bladder, the overlapping layer having an elongated length and extending laterally between a first end portion and a second end portion, the first end portion of the overlapping layer being positioned adjacent the fin structure of the main bladder; coupling the first end portion of the overlapping layer to the fin structure with a clamping structure; and coupling the second end portion of the overlapping layer to an anchor line to secure the overlapping layer to the foundation structure and to secure the overlapping layer against and over the main bladder.

In another embodiment, the method step of coupling the second end portion includes: decoupling the main bladder from the anchor line; and coupling the second end portion of the overlapping layer to the anchor line and the main bladder such that the anchor line secures the main bladder and the overlapping layer to the foundation structure. In another embodiment, the method step of positioning the overlapping layer includes positioning the overlapping layer having a first reinforcement element and a second reinforcement element embedded within the overlapping layer.

In accordance with another embodiment of the present invention, a method for limiting damage to an inflatable dam secured to a foundation structure with an anchor line is provided. The method includes: deflating a main bladder of an inflatable dam secured to a foundation structure such that, in a deflated state, the main bladder extends substantially flat between a fin structure and an anchor line, the fin structure and the anchor line extending along opposite sides and along a length of the main bladder; positioning an overlapping layer over an upward facing side of the main bladder, the overlapping layer having an elongated length and extending laterally between a first end portion and a second end portion, the first end portion defining apertures therein along the length of the overlapping layer such that the apertures correspond with the holes of the main bladder; coupling the first end portion of the overlapping layer to the fin structure with a clamping structure; decoupling the main bladder from the anchor line; and coupling the second end portion of the overlapping layer to the anchor line and the main bladder such that the anchor line secures the main bladder and the overlapping layer to the foundation structure.

In another embodiment, the method step of positioning the overlapping layer includes positioning the overlapping layer having a first reinforcement element and a second reinforcement element embedded within the overlapping layer. In another embodiment, the method step of positioning the overlapping layer includes positioning the overlapping layer having a fire resistant or fire retardant component associated therewith. In still another embodiment, the method step of positioning the overlapping layer includes positioning the overlapping layer such that the overlapping layer is only secured to the main bladder along first and second end portions of the overlapping layer. In another embodiment, the method further includes drilling holes in the fin structure of the main bladder so that the holes are aligned along the fin structure along the length of the fin structure and the main bladder.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
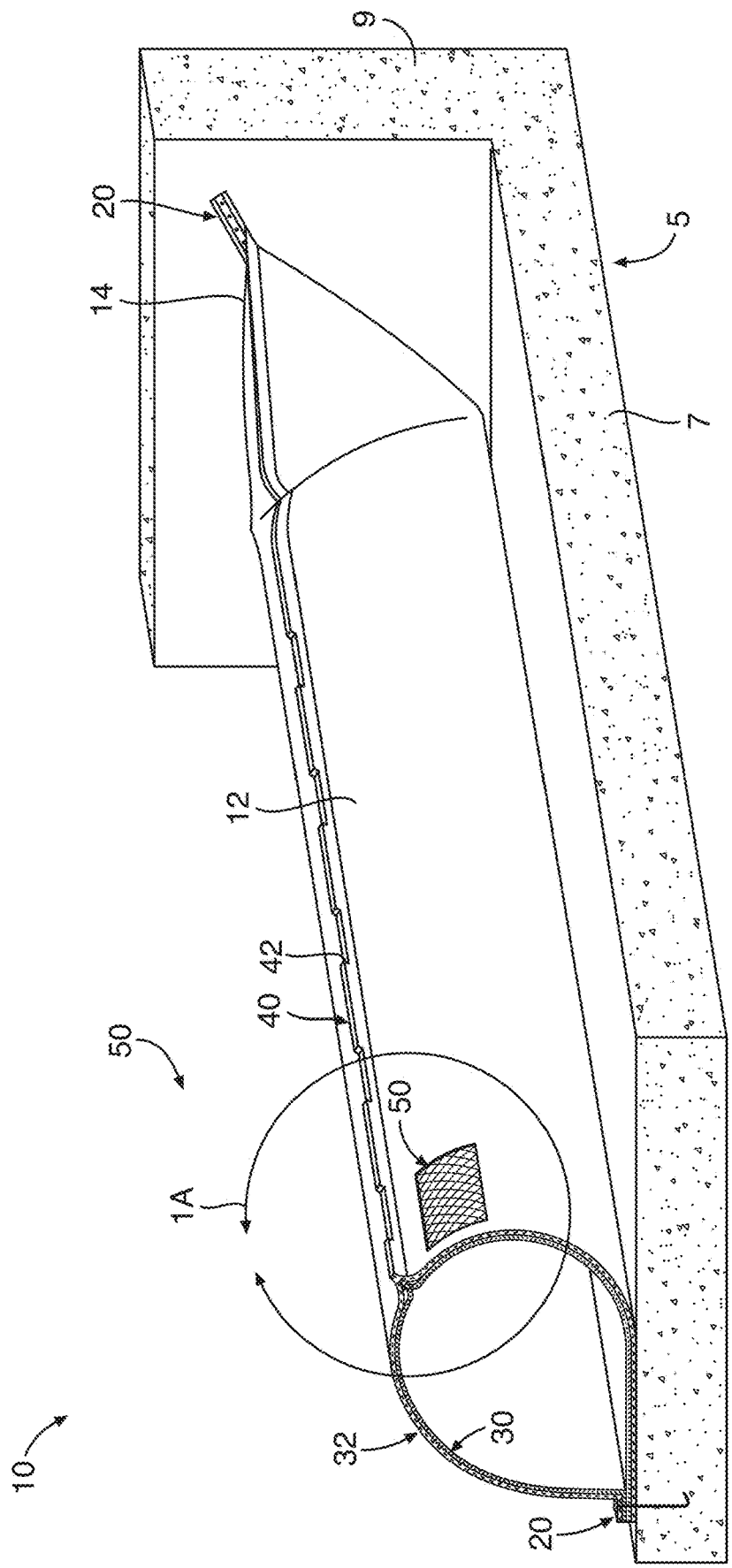
FIG. 1 is a cross-sectional perspective view of an inflatable dam, depicting the inflatable dam having multiple layers, according to one embodiment of the present invention.

Referring to FIG. 1, an inflatable dam 10 that may be positioned and secured to a foundation structure 5 is provided. The inflatable dam 10 is depicted in perspective view with one end of the inflatable dam 10 shown in cross-section to illustrate a structure of the inflatable dam 10. The inflatable dam 10 may be positioned and secured to a horizontal foundation portion 7 and between upstanding foundation portions 9. The inflatable dam 10 may be sized and configured to be readily moved between a deflated position (FIG. 4) and an inflated position such that, in the inflated position, the inflatable dam 10 may be employed to block or partially block the flow of water. Further, the inflatable dam 10 may be sized and configured to be puncture resistant in a manner to substantially prevent the inflatable dam 10 from being damaged by sharp objects, such as from passing debris or instruments of vandalism.

Figure 2:
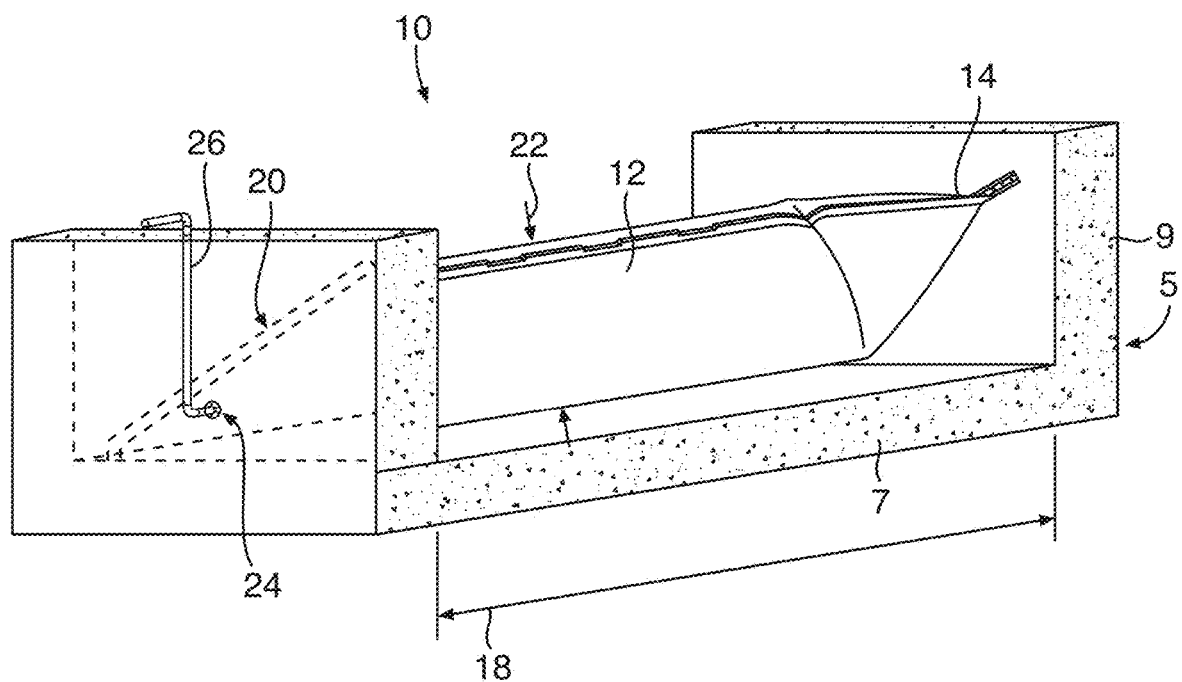
FIG. 2 is a perspective rear view or downstream view (viewing from downstream) of the inflatable dam in an inflated position, according to another embodiment of the present invention.
Figure 3:
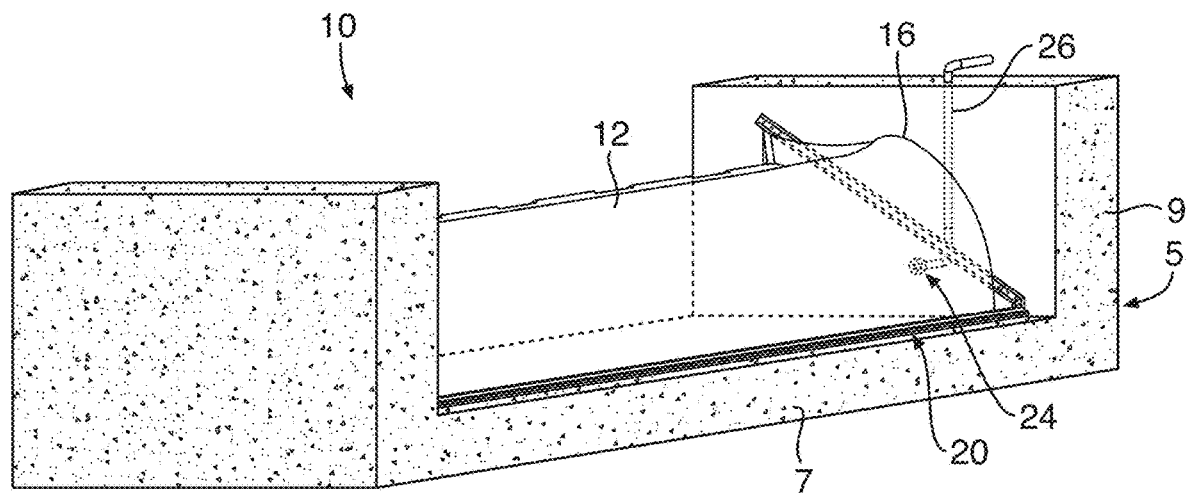
FIG. 3 is a perspective front view or upstream view (viewing from upstream) of the inflatable dam in the inflated position, according to another embodiment of the present invention.

With respect to FIGS. 1, 2 and 3, the inflatable dam 10 may extend with an elongated structure 12 so as to define a bladder. Such inflatable dam 10 may exhibit a cylindrical or tubular configuration. The elongated structure 12 of the inflatable dam 10 may extend between and terminate at a first end 14 and a second end 16 so as to define a longitudinal length 18 along the elongated structure 12. The inflatable dam 10 may also define a width 22 or a diameter. The first end 14 and the second end 16 of the inflatable dam 10 may be secured to opposite upstanding foundation portions 9 (that may extend vertically or at a slope, for example) with an anchor line 20, discussed further herein. Similarly, the inflatable dam 10 may be secured to the horizontal foundation portion 7 with the anchor line 20 extending along the length 18 of the inflatable dam 10 and along one side of the inflatable dam 10. In the inflated position, the elongated structure 12 of the inflatable dam 10 may extend to exhibit the tubular structure substantially along the length of the inflatable dam so as to narrow and close-off at the anchor line 20 along the first and second ends 14, 16 of the inflatable dam 10. It should be noted that the inflatable dam 10 may be sized to meet the requirements of a given water way such that the length and width depicted in FIGS. 2 and 3 is only provided by way of example since such dimensions may extend much longer or shorter depending upon the given requirements of a water way.

FIGS. 2 and 3 depict portions of the inflatable dam 10 and the foundation structure 5 in transparent form to depict a port and tubing arrangement, in simplified form, positioned at one end of the inflatable dam 10. For example, the inflatable dam 10 may define a port 24 sized and configured to facilitate inflation and deflation of the inflatable dam 10. The inflatable dam 10 may be inflated with air or water, or any other suitable fluid or combination of fluids. The port 24 may be defined adjacent to, for example, the second end 16 of the inflatable dam 10. The port 24 may be coupled to tubing 26 such that the tubing 26 may extend from the port 24 and through one of the upstanding foundation portions 9. Such tubing 26 may include various bends to extend through a top side of the upstanding foundation portion 9. In another embodiment, the tubing 26 may continue horizontally from the port 24 to an exterior surface of the foundation structure 5. In this manner, the port 24 and tubing 26 of the inflatable dam 10 may be employed for readily inflating and deflating the dam with, for example, a pumping or compressor system (not shown) or the like. As indicated, the port 24 and tubing 26 arrangement is depicted in simplified form, but may be any suitable port 24 and tubing 26 arrangement known to one of ordinary skill in the art that facilitates inflation and deflation of the inflatable dam 10.

Figure 1A:
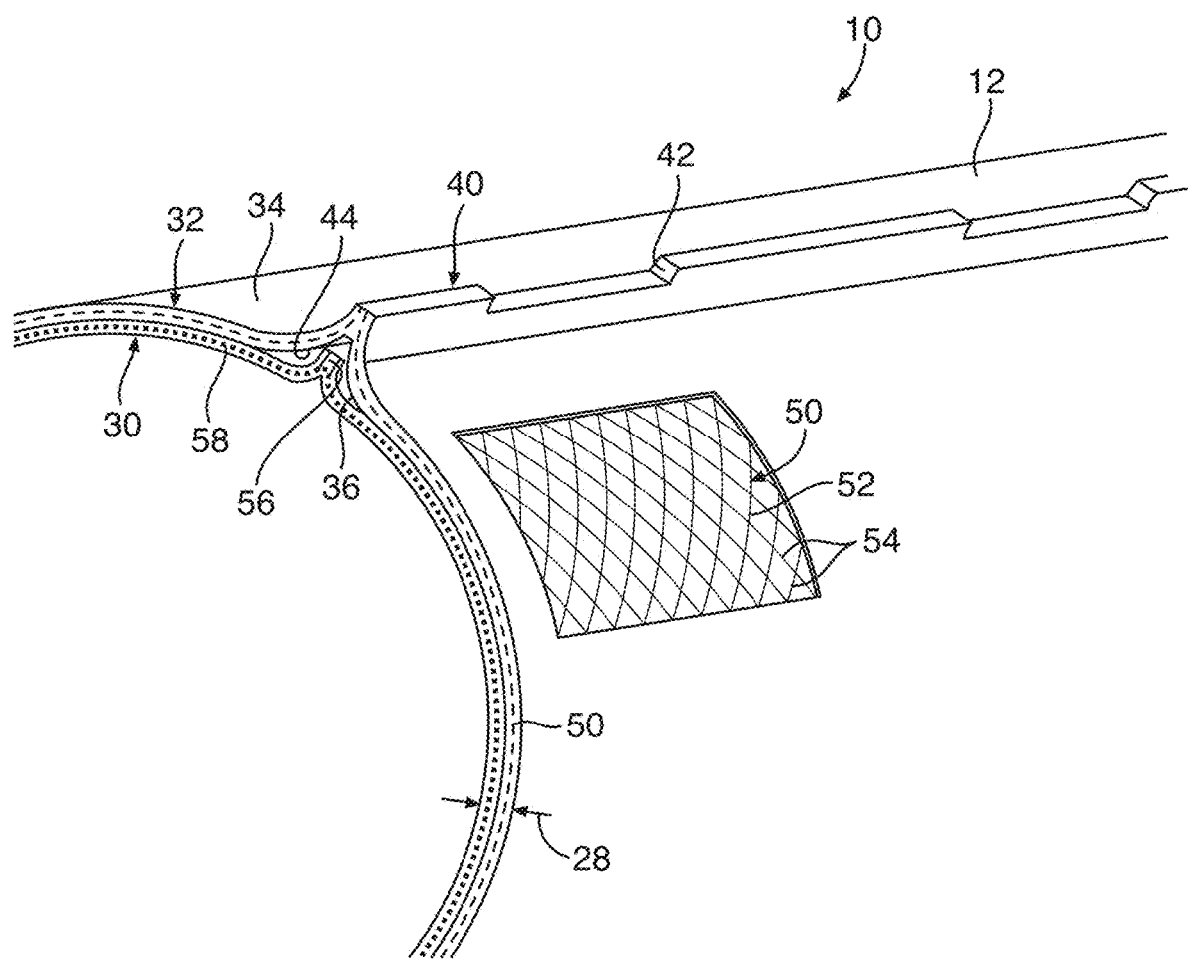
FIG. 1A is an enlarged view of the inflatable dam taken from section 1A of FIG. 1, depicting a cut-out portion of the inflatable dam, according to another embodiment of the present invention.

With reference to FIGS. 1 and 1A, the bladder or elongated structure 12 of the inflatable dam 10 may include a double layered flexible membrane. Such double layered flexible membrane may define a depth 28. In one embodiment, the inflatable dam 10 may include an inner member 30 or inner membrane and an outer member 32 or outer membrane each extending longitudinally along the length to form the elongated structure 12 such that the outer member 32 surrounds the inner member 30. The inner member 30 and outer member 32 positioned adjacent each other may define the depth 28 along the perimeter of the elongated structure 12. In one embodiment, the outer member 32 and the inner member 30 may be a polymeric material, such as rubber. In another embodiment, the outer member 32 and the inner member 32 may be a vulcanized neoprene/EPDM ("Ethylene Propylene Diene Monomer") rubber or any other suitable polymeric material known in the art.

The outer member 32 may define an exterior surface 34 and an interior surface 36, the exterior surface 34 being an exterior side of the inflatable dam 10 that may be exposed to passing debris and the like. The outer member 32 may define a fin structure 40, which may best be depicted in the inflated position. The fin structure 40 may be a seam for the outer member 32 such that the fin structure 40 may be formed by securing two interior surfaces 36 of two portions of the outer member 32 together with, for example, a heating process as known in the art or any other suitable process for securing two portions of the outer member 32 together to create a seam that defines the fin structure 40. The fin structure 40 may also define notches 42 formed therein, the notches 42 spaced along at least a portion of the length of the seam. The fin structure 40 may also define a crevice 44 or channel along an underside of the fin structure 40 or along the interior surface 36 of the fin structure 40 of the outer member 32. At the exterior side, such fin structure 40 and notches 42 may be employed to break-up or deflect the flow of water over the inflatable dam 10.

Further, the outer member 32 may include a reinforcement element 50. The reinforcement element 50 may be embedded within the outer member 32, as shown in cut-out portion of FIG. 1A. In one embodiment, the reinforcement element 50 may be a single layer of reinforcement material. In another embodiment, the reinforcement element 50 may include multiple layers spaced and embedded or adjacently stacked and embedded in the outer member 32. The reinforcement element 50 may be sized and configured to resist punctures. The reinforcement element 50 may extend substantially through the outer member 32, in an embedded manner, along the length and width of the outer member 32 such that the reinforcement element 50 may correspond with and be substantially the same size as the outer member 32. In this manner, the reinforcement element 50 may completely surround the inner member 30 since the outer member 32 surrounds the inner member 30. Further, the reinforcement element 50 may extend within the outer member 32 such that such reinforcement element 50 is disposed between the exterior surface 34 and the interior surface 36 of the outer member 32, or in other words, the reinforcement element 50 may be embedded within the outer member 32. The reinforcement element 50 may be a high-strength element, such as a metallic material or a high strength polymeric material.

In one embodiment, the reinforcement element 50 may be a wire mesh 52 or mesh material. In a further embodiment, the wire mesh 52 may be a steel wire mesh member. In another embodiment, the reinforcement element 50 may be a metallic material, such as steel, or any other suitable metallic material. In another embodiment, the wire mesh 52 may be woven or a unitary seamless member or may include a unitary portion with additional wires woven therethrough. In another embodiment, the reinforcement element 50 may define a mesh structure or a multi-cellular structure. In another embodiment, the mesh structure or the multi-cellular structure may define struts 54 extending to define cells. The struts 54 defining each cell may be about 1 inch in length or may be smaller or larger, such as in the range between about 0.5 inches and about 1.5 inches, as desired. In another embodiment, the struts 54 defining each cell of the reinforcement element 50 may be within the range between about 0.25 inches and about 1.5 inches, or within the range between about 0.1 inch and about 2 inches. As set forth, in one embodiment, the reinforcement element 50 may be a polymeric material, such as a para-aramid, meta-aramid, or copolyamide, or the like or any other high strength polymeric material that may include high strength fibers or may be in the form of fabric or the like, or any other material suitable for embedding within the outer member 32 that will resist and protect the inner member 30 from sharp debris or instruments of vandalism.

In still another embodiment, the reinforcement element 50 may be similar to a mesh, but without the cross-member, such that the reinforcement element 50 may extend with multiple parallel cables that may be substantially evenly spaced relative to each other and embedded within the outer member 32, similar to that previously set forth. The laterally spaced distance between the parallel extending cables may be similar to the ranges for the length of the struts 54 defining the cells previously described for the wire mesh 52. In one embodiment, the cables may be in the form of cord or wires or the like. In another embodiment, such multiple parallel cables may be braided steel cables embedded in the outer member 32. In another embodiment, the multiple parallel cables may be polymeric cables, extending in a braided, woven, cord or wire like manner. In another embodiment, the multiple parallel cables may extend in an elongated manner so as to extend substantially parallel relative to a length 92 (FIG. 8) of the outer member 32. In another embodiment, the multiple parallel cables may extend in an elongated manner so as to extend laterally (at any orientation) relative to the length 92 of the outer member 32. In yet another embodiment, the multiple parallel cables may extend in an elongated manner so as to extend substantially perpendicular relative to the length 92 of the outer member 32.

The inner member 30 may be disposed within the outer member 32. The inner member 30 may be employed as a bladder for holding an inflation medium, such as air or water, as previously set forth. The inner member 30 may be a separate and discrete structure from the outer member 32 (but for being directly coupled together via the anchor line 20 along the foundation of the inflatable dam 10). In this manner, with the inner and outer members 30, 32 being coupled together at the foundation of the inflatable dam 10, the inner member 30 may be moveable within the outer member 32 so as to provide give or adjust relative to the outer member 32 should potential sharp debris puncture through the reinforcement element 50 of the outer member 32. In one embodiment, the anchor line 20 of the inflatable dam 10 may extend along the lower foundation portion 7 as a single anchor line, as depicted. In another embodiment, depending on sizing requirements, the anchor line 20 may extend with double anchor lines, such as the depicted anchor line 20 extending along the lower foundation portion 7 and another anchor line extending, for example, parallel to the depicted anchor line 20 along the lower foundation portion 7, or any other variation/configuration of anchor line layouts extending along the foundation structure 5, as may be necessary due to sizing requirements or any other requirements or specifications desired or needed for a given inflatable dam 10.

The inner member 30 may define a inner fin structure 56 that may extend along an entire length of the inner member 30. The inner fin structure 56 of the inner member 30 may be formed by employing a heat process similar to forming the fin structure 40 of the outer member 32. The inner fin structure 56 may be sized and configured to be disposed within the crevice 44 or channel on the interior side of the fin structure 40 of the outer member 32. Such inner fin structure 56 of the inner member 30 may be employed to maintain alignment of the inner member 30 relative to the outer member 32. In this manner, with the water being held by the dam and often providing various pressures and various amounts of water flowing-over the dam 10, the inner fin structure may assist in maintaining alignment between the inner member 30 and the outer member 32 upon inflation and deflation of the dam.

As set forth, the inner member 30 may be a polymeric rubber material, such as vulcanized neoprene/EPDM rubber. In a further embodiment, the inner member 30 may include an inner reinforcement element 58 (shown as dashed line) in FIG. 1A. The inner reinforcement element 58 may include multiple layers of woven polyester reinforcing material embedded within the inner member 30, such as three to four layers of woven polyester reinforcing material. Further, the inner reinforcement element 58 may be embedded within and sized along an entire length and width of the inner member 30. With this arrangement, the outer member 32 may include the reinforcement element 50 embedded therein and the inner member 30 may include the inner reinforcement element 58 so as to provide reinforcement to the inner member 30 and also facilitate resistance to potential punctures of the inner member 30 from passing debris and/or instruments of vandalism, making the inflatable dam 10 a substantial improvement relative to durability and longevity from previous inflatable dam systems.

Figure 4:
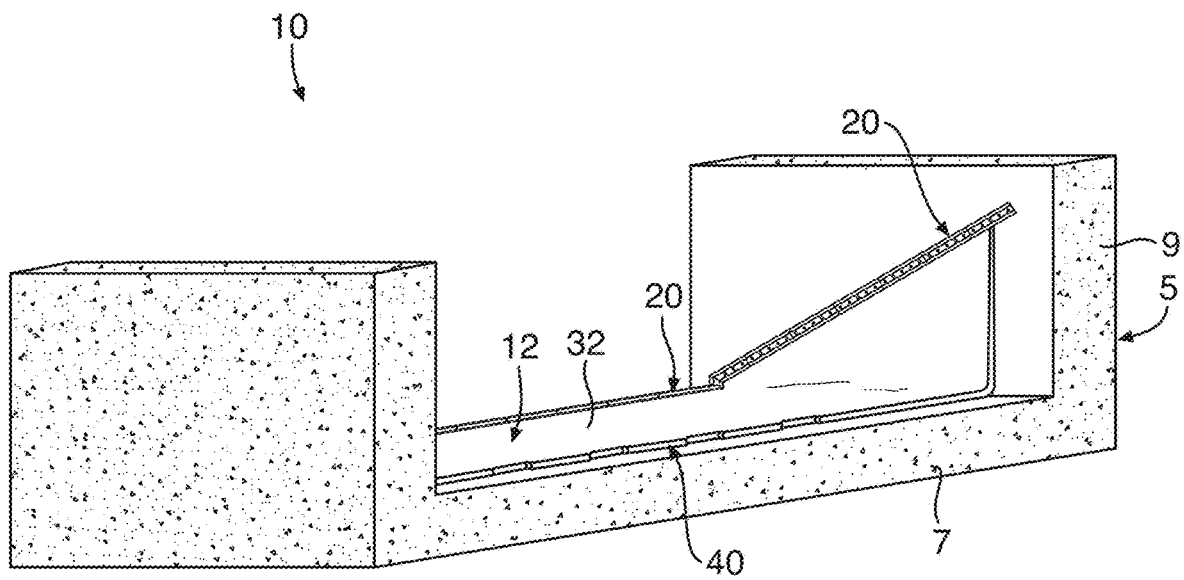
FIG. 4 is a perspective rear view or downstream view of the inflatable dam in a deflated position, according to another embodiment of the present invention.
Figure 5:
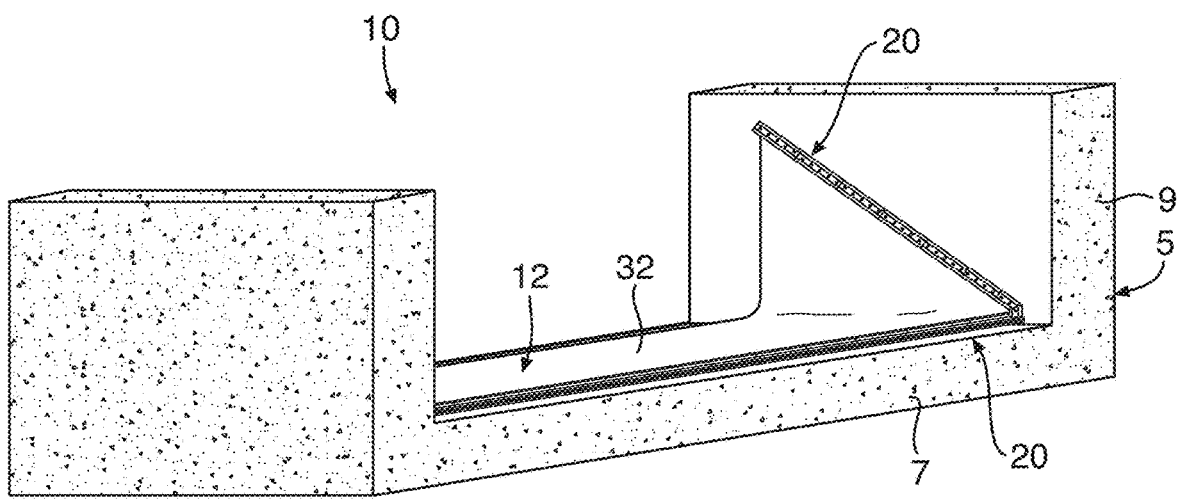
FIG. 5 is a perspective front view or upstream view of the inflatable dam in the deflated position, according to another embodiment of the present invention.
Figure 7:
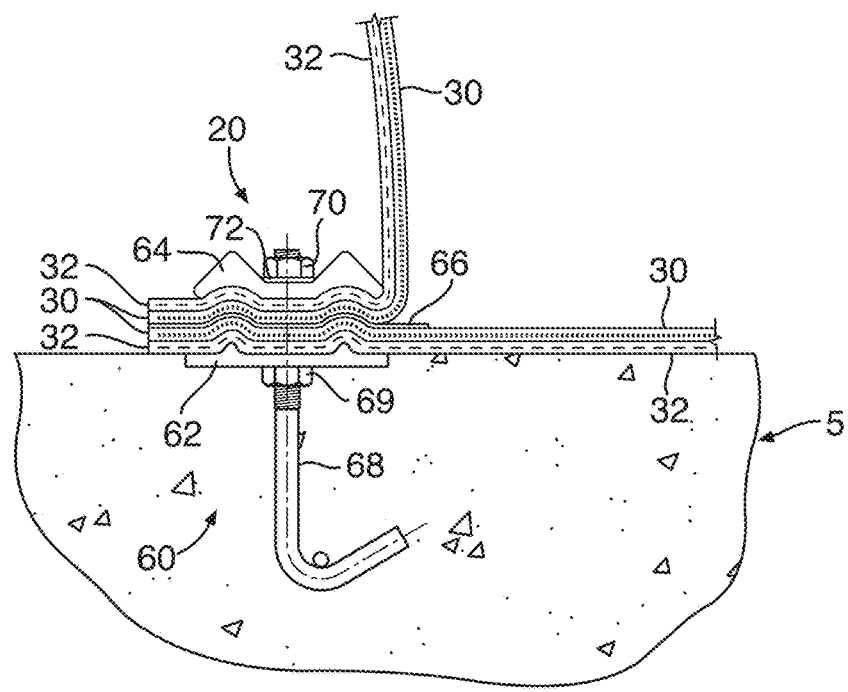
FIG. 7 is a side cross-sectional view of the anchor line assembly clamped to the foundation structure to form an anchor line for the inflatable dam, according to another embodiment of the present invention.

Now with reference to FIGS. 4, 5, and 7 depictions of respective rear and front perspective views of the inflatable dam 10 in the deflated position are provided. In the deflated position, the elongated structure 12 of the inflatable dam 10 with the inner and outer members 30, 32 may sit in a substantially flattened position. In the deflated position, the outer member 32 may be folded over with the inner member 30 such that free ends of the inner and outer members over-lap each other in a clamped and air tight manner under and along the anchor line 20 (see FIG. 7). The anchor line 20 (clamping the free ends of the inner and outer members 30, 32) may extend longitudinally along the horizontal foundation portion 7 and at a diagonal upward along each of the upstanding foundation portions 9. At the opposite side of the foundation structure 5, the fin structure 40 may extend longitudinally so as to extend and lay along a floor of the horizontal foundation portion 7 of the foundation structure 5. At opposite end portions of the elongated structure 12, including the inner and outer members 30, 32, of the inflatable dam 10, such end portions may fold upward so as to extend upward and along the oppositely facing upstanding foundation portions 9 to angled portions of the anchor line 20. In this manner, the inflatable dam 10 may extend in a flat configuration over the foundation structure 5 in the deflated position.

Figure 6:
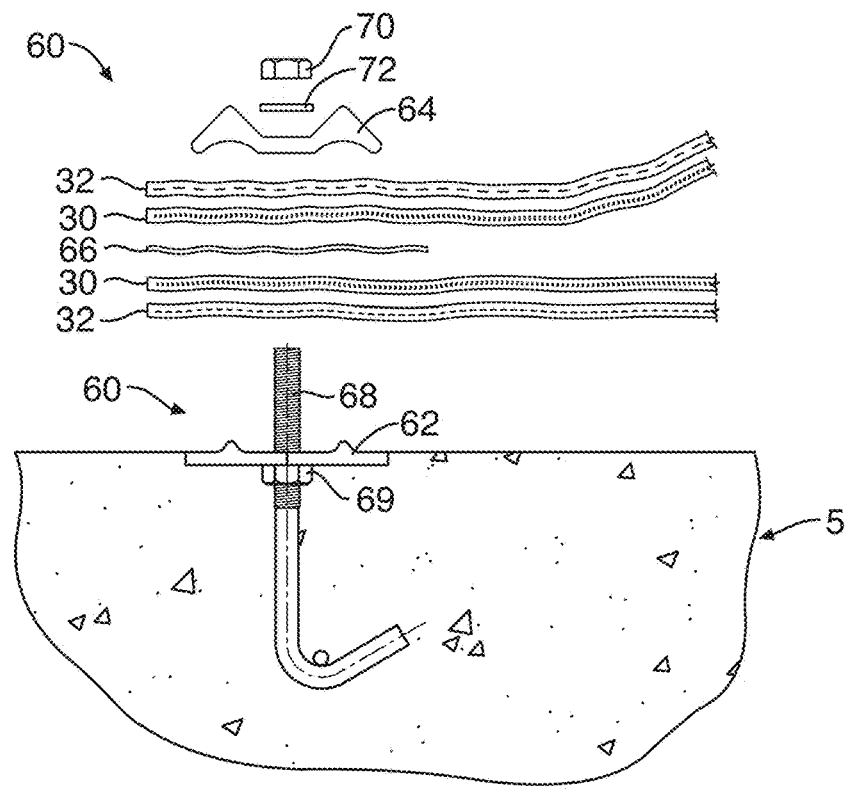
FIG. 6 is an exploded side cross-sectional view of an anchor line assembly for anchoring the inflatable dam to the foundation structure, according to another embodiment of the present invention.

With reference to FIGS. 5, 6, and 7, one embodiment for installing the inflatable dam 10 will now be described. Upon positioning the inner and outer members 30, 32 over the foundation as desired, each of the loose ends of the folded-over inner and outer members 30, 32 may be positioned to be aligned and over-lap each other such that the inflatable dam 10 may be prepared and aligned for coupling to the foundation structure 5 with an anchor line assembly 60 to form the before discussed anchor line 20.

In one embodiment, the anchor line assembly 60 may include first and second plate members 62, 64, a sealing member 66, anchor bolts 68 with leveling nuts 69, anchor nuts 70 and washers 72. The anchor line assembly 60 may include other components that may be suitable for fastening the inflatable dam 10 to the foundation structure 5. The first and second plate members 62, 64 may be employed as clamping structures that may be formed from galvanized cast steel or any other suitable material as known in the art. In one embodiment, the first and second plate members 62, 64 may be elongated and extend linearly and may include multiple first plate members 62 and multiple second plate members 64. The sealing member 66 may be an air sealing rubber sheet made from one or more polymeric materials. For example, the air sealing rubber sheet may be an un-vulcanized neoprene/EPDM rubber. The sealing member 66, such as the air sealing rubber sheet may be formed as a thin elongated strip sized to be positioned between the loose ends of the inner member 30. Further, sealing member 66 may extend along the entire anchor line 20 to be employed as an air sealing gasket for the bladder or inner member 30. The anchor bolts 68, anchor nuts 70, and washers 72 may be formed from galvanized cold drawn steel or stainless steel (or galvanized weldable grade steel, such as ASTM A307 or similar) and may be sized for securing and tightening the inflatable dam 10 to the foundation structure 5. In another embodiment, the anchor line assembly 60 may be employed as described and depicted, but without the sealing member 66.

As set forth, upon positioning and aligning the loose ends of the inner and outer members 30, 32 along the foundation structure, the sealing member 66 may be positioned between the loose ends of the inner member 30. In addition, the first plate members 62 may be positioned directly against the foundation structure 5 and under each of the loose ends of the inner and outer members 30, 32. The second plate members 64 may be positioned over each of the loose ends of the outer and inner members 32, 30. The first and second plate members 62, 64 may define apertures such that the apertures of the first plate members 62 may align with the apertures of the second plate members 64. The anchor bolts 68 may be secured to the foundation structure with, for example, epoxy if the foundation is a pre-existing structure or the anchor bolts 68 may be pre-set as the foundation is being formed.

In one embodiment, the inflatable dam 10 may be secured to the foundation structure with the anchor line assembly 60 by positioning the first plate members 62 over each of the anchor bolts 68 secured to the foundation structure 5. The loose ends of the outer and inner members 32, 30 may then be positioned over the secured anchor bolts 68 along with the sealing member 66 disposed between the loose ends of the inner member 30. The second plate members 64 may then be positioned over the bolts 68, after which, the washers 72 and nuts 70 may be tightened over the anchor bolts 68 and the second plate members 64. With this arrangement, the second plate members 64 may be employed to clamp down against the loose ends of the outer and inner members 32, 30 to securely anchor the inflatable dam 10 to the foundation and create a seal via the sealing member 66 so that the inner member 30 may be employed as an air tight bladder that may be selectively inflated and deflated, as desired.

Figure 8:
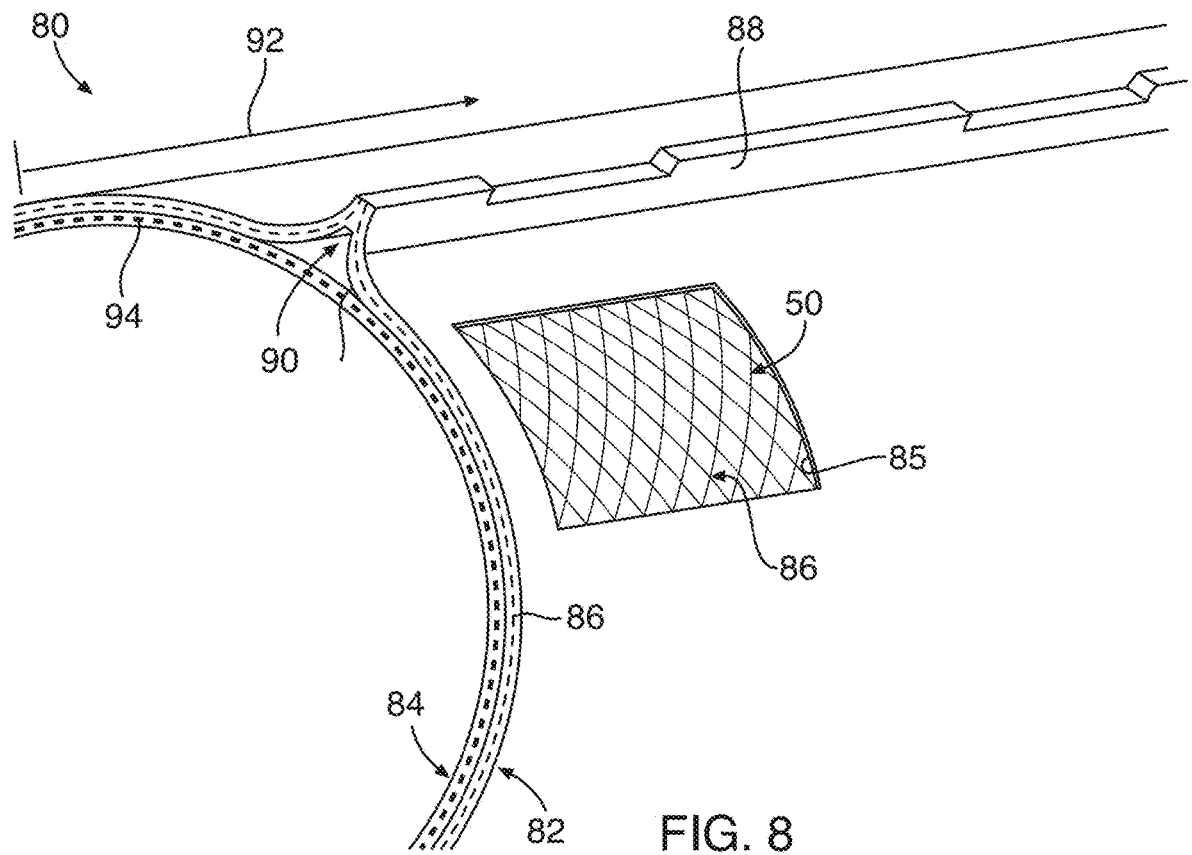
FIG. 8 is an enlarged view of another embodiment of the inflatable dam, depicting the inflatable dam with an inner member without a fin structure, according to the present invention.

With reference to FIG. 8, another embodiment of an inflatable dam 80 is provided. This embodiment is similar to the previous embodiments set forth and described relative to FIGS. 1-7, except this embodiment does not include the before described inner fin structure. Similar to the previous embodiment, the inflatable dam 80 may include an outer member 82 and an inner member 84 with a reinforcement element 86 embedded in the outer member 82. The reinforcement element 86 is shown in the cut-out portion 85 depicted in the outer member 82 and also is represented by a dashed line. Further, the outer member may include a fin structure 88. As previously set forth, the inner member 84 of the inflatable dam 80 of this embodiment does not extend with an inner fin structure. Rather, the inner member 84 extends continuously below the fin structure 88 of the outer member 82 to define a gap 90 between the inner member 84 and the fin structure 88 of the outer member 82. Such gap 90 may extend, at least partially, along a length 92 of the outer member 82 or fin structure 88 of the outer member 82. As set forth in previous embodiments, the inner member 84 may include an inner reinforcement element 94 embedded within the inner member 84, as shown by a dashed line. With this arrangement, the inflatable dam 80 of this embodiment includes multiple layers, the outer member 82 of the multiple layers having the reinforcement element 86 sized and configured to protect the inner member 84 from sharp objects and potential vandalism. Further, the inner member 84 also may include the inner reinforcement element 94 to further protect puncturing the inner member 84 from sharp objects and potential vandalism.

Figure 9:
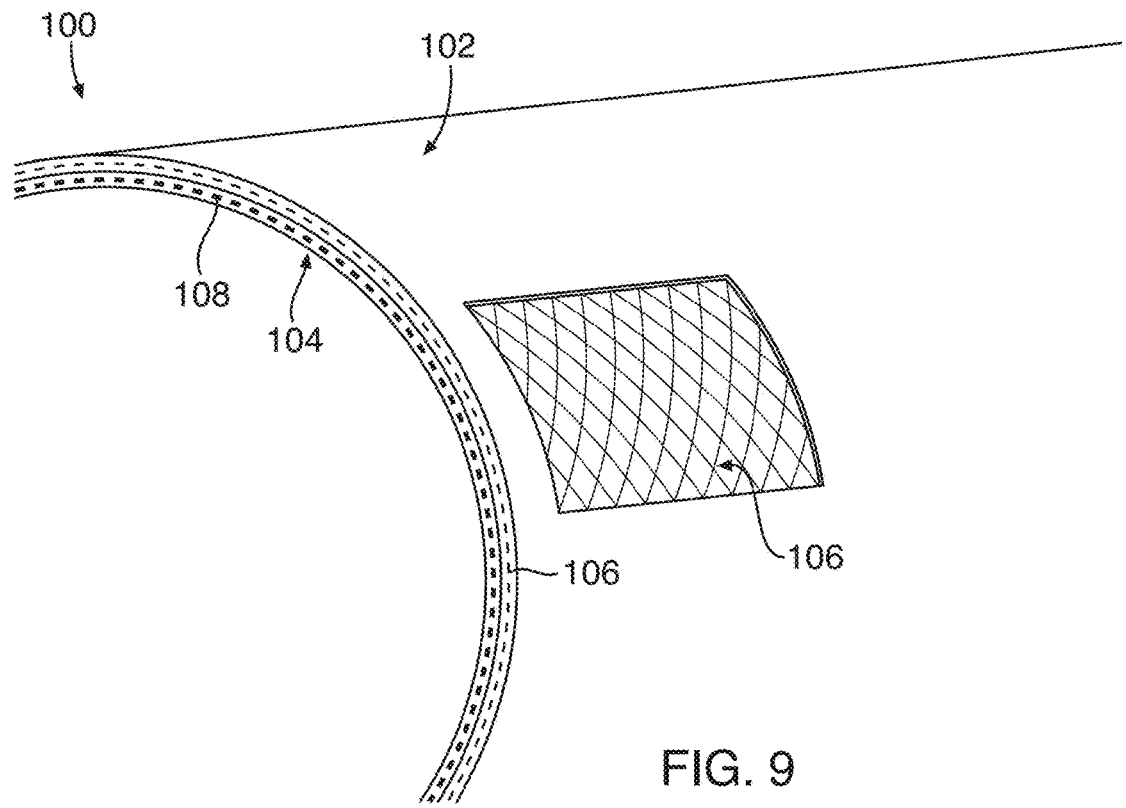
FIG. 9 is an enlarged view of another embodiment of the inflatable dam, depicting the inflatable dam having an outer member and an inner member each without a fin structure, according to the present invention.

Now with reference to FIG. 9, another embodiment of an inflatable dam 100 is provided. This embodiment is similar to the previous embodiments described and depicted relative to FIGS. 1-7, except this embodiment of the inflatable dam 100 does not include fin structures extending from either outer or inner members of the inflatable dam. Similar to the previous embodiments described herein, the inflatable dam 100 may include multiple layers. The inflatable dam may include an outer member 102 and an inner member 104, the inner member 104 extending within the outer member 102 and configured to be the bladder of the inflatable dam to hold air or fluid. Further, similar to the previous embodiments, the outer member 102 may include a reinforcement element 106 embedded within the outer member 102, shown in the cut-out portion as well as by a dashed line. Also, the inner member 104 may include an inner reinforcement element 108, depicted with a dashed line. In this manner, the reinforcement element 106 of the outer member 102 and the inner reinforcement element 108 of the inner member 104 may facilitate protecting the inner member 104 from being punctured from sharp objects and potential vandalism.

Figure 10:
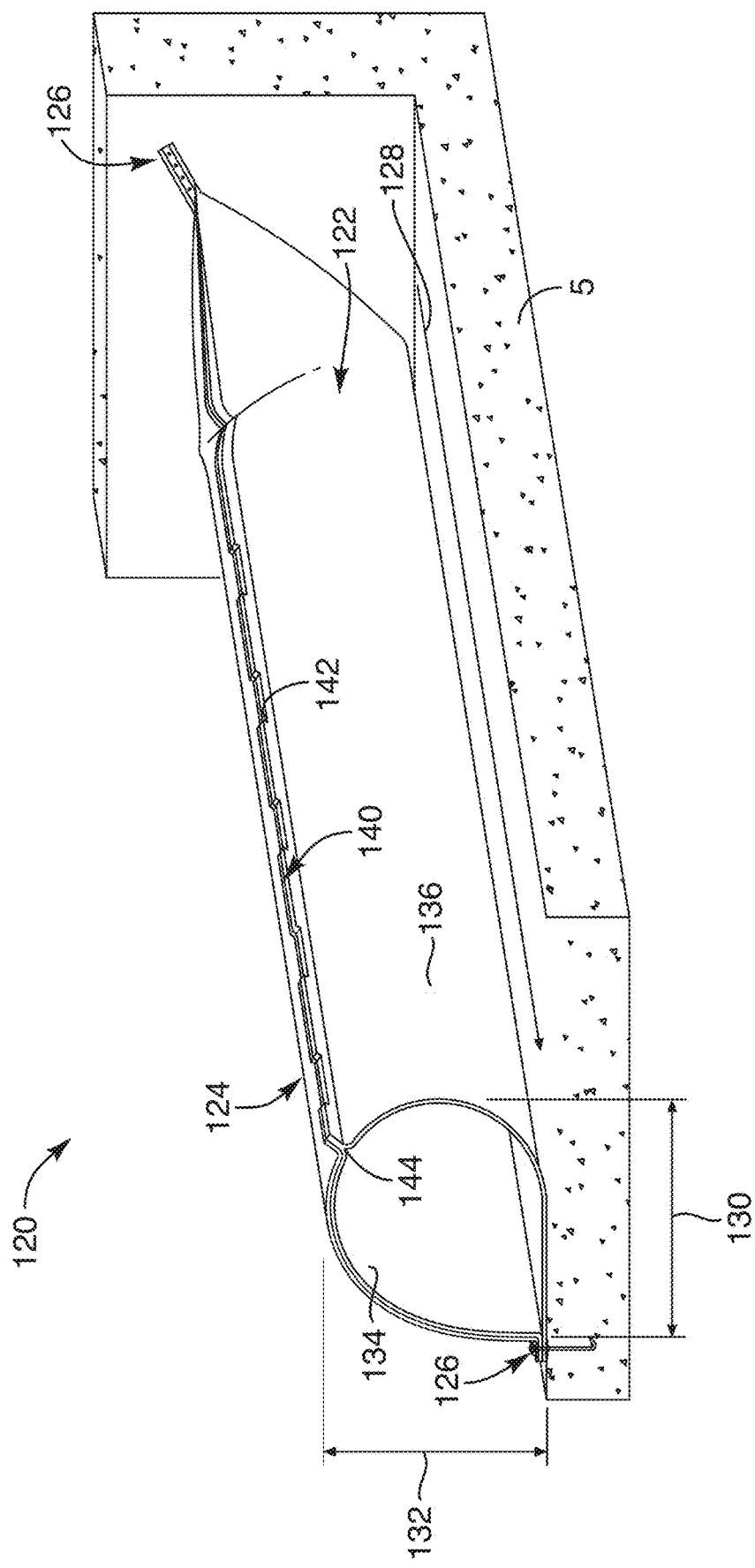
FIG. 10 is a cross-sectional perspective view of another embodiment of an inflatable dam, depicting the inflatable dam having an additional overlapping layer along an upstream side of the inflatable dam, according to the present invention.
Figure 11:
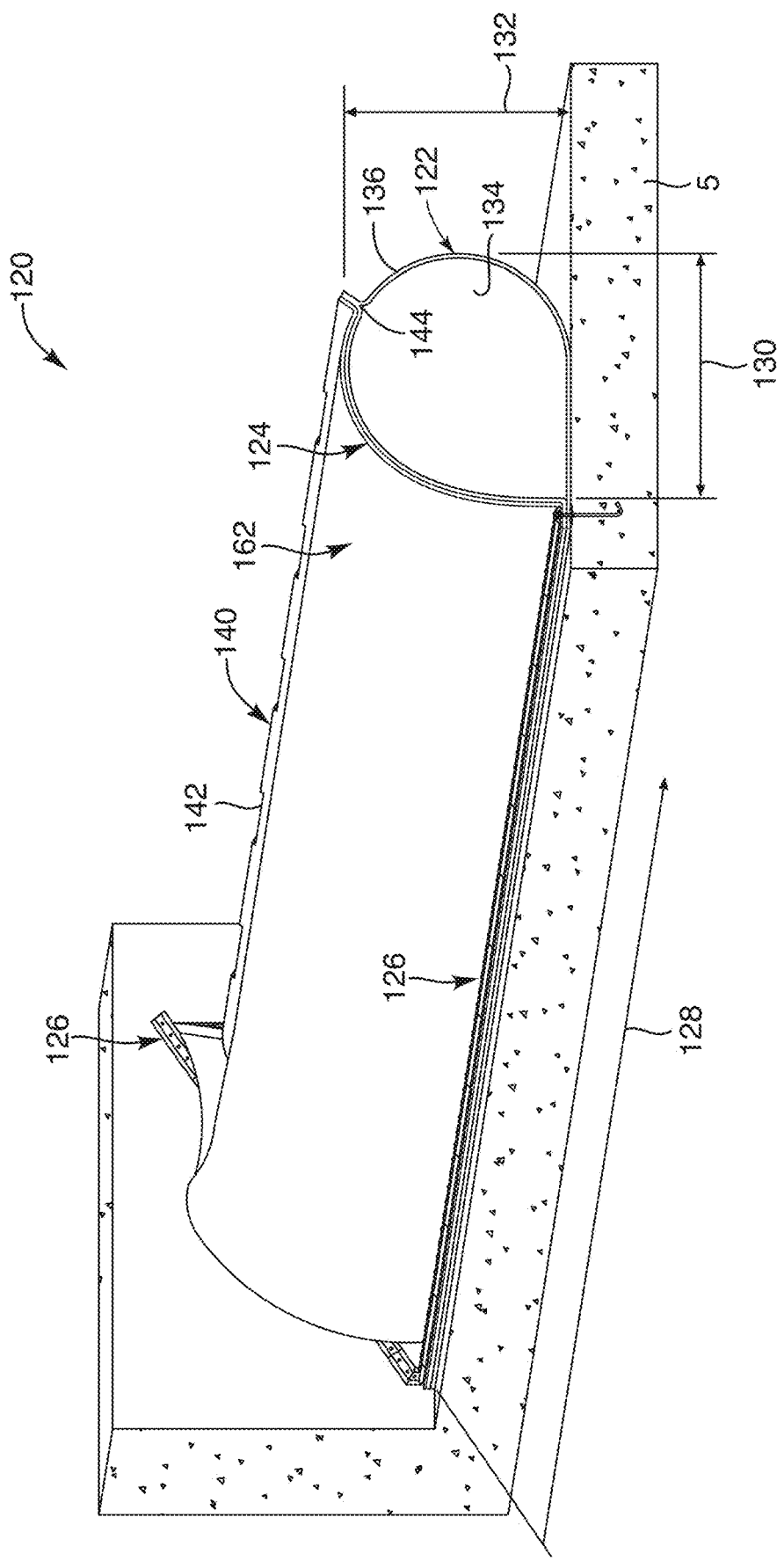
FIG. 11 is a cross-sectional perspective view of the downstream side of the inflatable dam of FIG. 10, according to the present invention.

With reference to FIGS. 10 and 11, another embodiment of an inflatable dam 120 is provided. In this embodiment, the inflatable dam 120 may be sized and configured with structural characteristics to resist fire damage as well as other types of vandalism as previously set forth herein. For example, the inflatable dam 120 of this embodiment may include a main bladder 122 with an overlapping layer 124. The inflatable dam 120 may extend over a foundation structure 5 and be secured thereto with an anchor line 126 similar to previous embodiments. As such, upon the inflatable dam 120 being inflated, the inflatable dam 120 may extend with a tubular configuration with a length 128, a width 130, and height 132, the width 130 and the height 132 may be a general diameter dimension. Further, the main bladder 122 may extend with an inner surface 134 and an outer surface 136. The outer surface 136 may exhibit a fin structure 140 along the length 128 of the outer surface 136. Such fin structure 140 may include notches 142 along the length 128 of the fin structure 140 and inflatable dam 120, similar to previous embodiments. The inner surface 134 may define an elongated crevice 144 or channel along an underside of the fin structure 140, similar to previous embodiments.

Figure 11A:
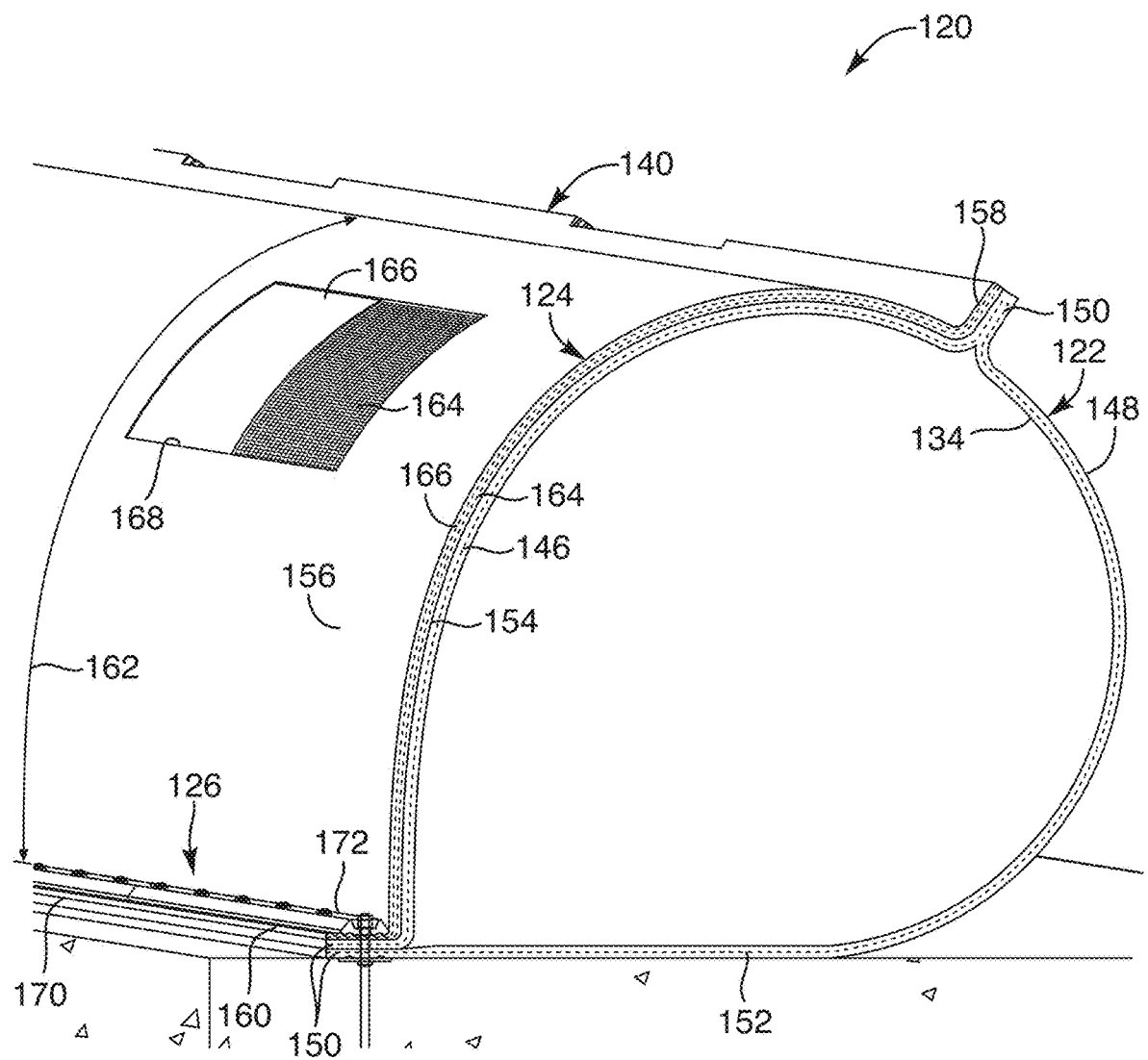
FIG. 11A is an enlarged cross-sectional perspective view of the inflatable dam of FIG. 11, depicting a cut-out portion to exhibit various structural characteristics of the inflatable dam, according to another embodiment of the present invention.

With reference to FIGS. 11 and 11A, the main bladder 122 may extend with a first portion 146 and a second portion 148 that may be coupled at end portions 150 along the inner surface 134 of the first and second portions 146, 148 to form the fin structure 140. Similar to that described in previous embodiments, the end portions 150 of the first and second portions 146, 148 of the main bladder 122 may be bonded with heat and/or adhesive to form the fin structure 140, as known to one of ordinary skill in the art. At the opposite side of the main bladder 122, the opposite end portions 150 of the first and second portions 146, 148 of the main bladder 122 may be coupled along their length 128 to the foundation structure 5 with the anchor line 126. With this arrangement, the inflatable bladder 120 may be moved to an inflated state and a deflated state (see FIGS. 4 and 5), similar to that described in previous embodiments.

The first and second portions 146, 148 of the main bladder 122 may be a rubber material or the like that may include a reinforcement element 152 embedded therein to assist in the structural integrity of the main bladder 122. Such reinforcement element 152 may be a woven fabric, such as polyester or nylon or any other suitable reinforcing fabric that may be embedded within the main bladder 122. In another embodiment, the reinforcement element 152 may also include a ceramic chip layer embedded within the first and second portions 146, 148 of the main bladder 122. Each of the first and second portions 146, 148 of the main bladder 122 may be flat sheet members connected along the fin structure 140 such that, upon inflating the inflatable dam 120, the first and second portions 146, 148 of the main bladder 122 collectively extend with the tubular configuration along a majority of the length 128 of the inflatable dam 120.

The overlapping layer 124 or overlapping portion may extend over the first portion 146 along the length 128 of the main bladder 122 and extend laterally between the fin structure 140 and the anchor line 126. Such overlapping layer 124 may also be a flat rubber member or sheet with similar dimensions and sizing as the first portion 146 of the main bladder 122. Further, the overlapping layer 124 may extend to define an internal surface 154 and an external surface 156. The overlapping layer 124 may define a first end portion 158 and a second end portion 160 with an intermediate portion 162 therebetween. The first end portion 158 of the overlapping layer 124 may be pre-bonded to the fin structure 140 of the main bladder 122 along the length 128 of the fin structure 140. In this manner, the first end portion 158 of the overlapping layer 124 may be integral or integrally formed with the fin structure 140 of the main bladder 122 of the inflatable dam 120. In another embodiment, the first end portion 158 may be coupled to the end portion 150 and fin structure 140 with clamps and/or a bolt and bracket arrangement, discussed in further detail herein. Further, upon installing the inflatable dam 120 to the foundation structure 5, the second end portion 160 of the overlapping layer 124 may also be coupled to the main bladder 120 by being sandwiched between the anchor line 126 and the corresponding one of the end portions 150 of the first portion 146 of the main bladder 122 (see FIGS. 12 and 13). The intermediate portion 162 of the overlapping layer 124 may extend over the first portion 146 of the main bladder 122 in a non-coupled manner (or separate and discrete non-bonded manner). In this manner, the overlapping layer 124 may be coupled to the main bladder 122 along the length 128 of the opposing first and second end portions 148, 150 of the overlapping layer 124.

The overlapping layer 124 may include one or more reinforcement elements, such as a first reinforcement element 164 and a second reinforcement element 166, embedded within the overlapping layer 124, as depicted with dashed lines in FIG. 11A and as depicted in the dual depth cut-out portion 168 of FIG. 11A. In one embodiment, the first reinforcement element 164 may be a woven fabric, such as polyester or nylon or any other suitable woven fabric. In another embodiment, the first reinforcement element 164 may include a fire retardant element or fire resistant element, such as a coated nylon, Polybenzimidazole (PBI) or any other suitable fire retardant or fire resistant material that may be embedded within the overlapping layer 124. In another embodiment, the fire retardant element or fire resistant element may be a chemical integrated throughout the rubber material of the overlapping layer 124. In another embodiment, the main bladder 122 may include the chemical integrated throughout the rubber material to hold fire retardant or fire resistant characteristics therein such that the main bladder 122 may or may not include the overlapping layer 124 therewith. The second reinforcement element 166 may be a ceramic chip layer or the like or any other suitable reinforcement element. In one embodiment, the second reinforcement element 166 may be positioned above or closer to an external surface 156 of the overlapping layer 124 than the first reinforcement element 164. In another embodiment, the first reinforcement element 164 may be positioned above or closer to the external surface 156 of the overlapping layer 124 than the second reinforcement element 166. Each of the first and second reinforcement elements 164, 166 may extend in a layered manner and embedded within the overlapping layer 124 such that the first and second reinforcement elements 164, 166 may be sized similarly to length and width dimensions of the overlapping layer 124, but may be slightly smaller such that the first and second reinforcement elements 164, 166 are not exposed along a periphery 170 of the overlapping layer 124.

Figure 12:
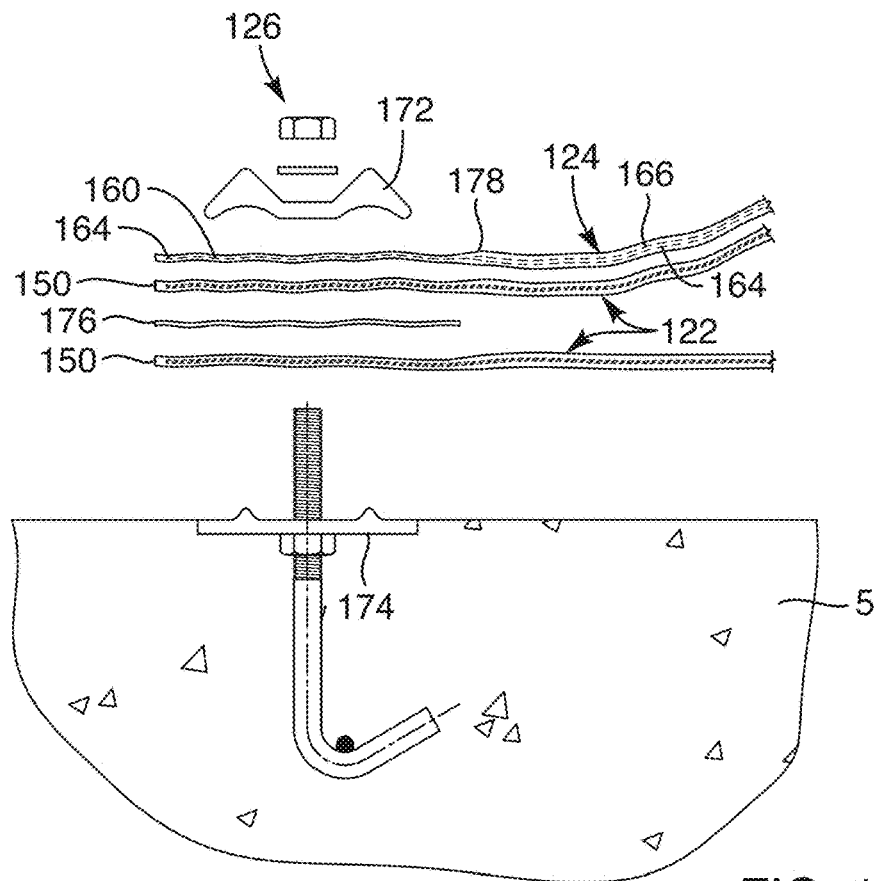
FIG. 12 is an exploded side cross-sectional view of an anchor line assembly for anchoring the inflatable dam to the foundation structure, according to another embodiment of the present invention.
Figure 13:
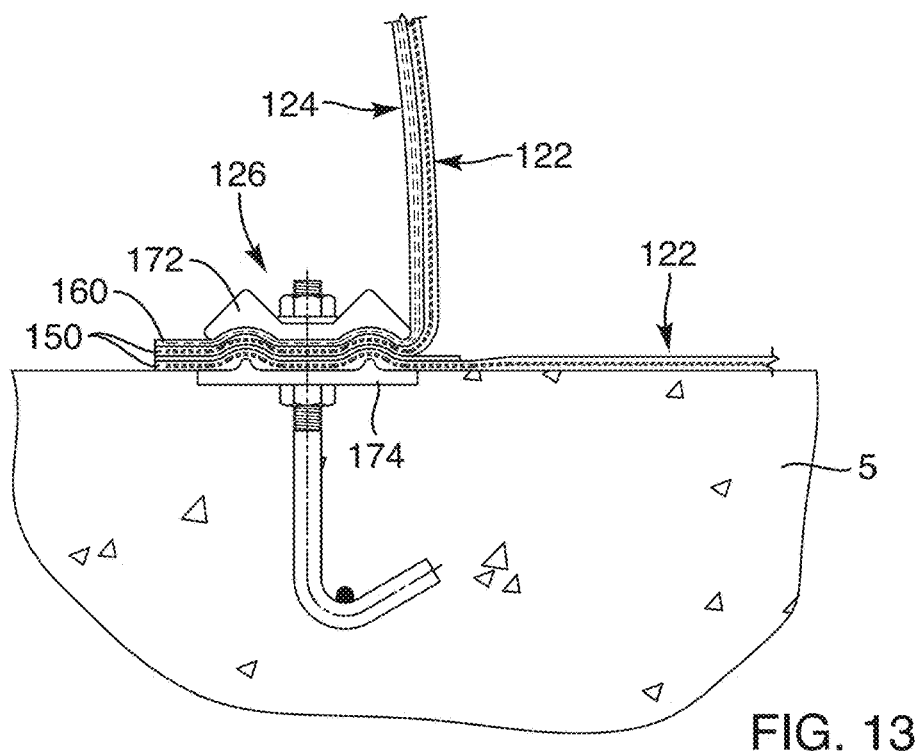
FIG. 13 is a side cross-sectional view of the anchor line assembly clamped to the foundation structure to form an anchor line for the inflatable dam, according to another embodiment of the present invention.

Now with reference to FIGS. 11A, 12 and 13, installation of the inflatable dam 120 having the overlapping layer 124 to the foundation structure 5 may be employed in a similar manner described in previous embodiments. For example, the second end portion 160 of the overlapping layer 124 and end portions 150 of the main bladder 122 may be sandwiched between first and second plate members 172, 174 of the anchor line 126. Such anchor line 126 may also include other structural components, such as an anchor bolt, bolts and washers, as previously set forth in previous embodiments. Further, similar to previous embodiments, the end portions 150 of the main bladder 122 may include a sealing member 176 therebetween to act as an air-stop to maintain the main bladder 122 in the inflated state. In this manner, the main bladder 122 may maintain the inflatable dam 120 in the inflated state with the additional overlapping layer 124 coupled with the anchor line 126 to provide protection to the main bladder 122 from potential vandalism.

At the anchor line 126, each of the respective layers of the inflatable dam 120 that are disposed between the first and second plate members 172, 174 of the anchor line 126, such as the second end portion 160 of the overlapping layer 124 and the end portions 150 of the main bladder 122, may include a thickness that is smaller than the remaining portion or other portions of the main bladder 122 and overlapping layer 124. In other words, adjacent to the second end portion 160 of the overlapping layer 124 and the end portions 150 of the main bladder 122 may define a taper 178 to the thickness of the portions of the inflatable dam 120 disposed between the first and second plate members 172, 174 of the anchor line 120. Further, the second reinforcement element 166 that may define a ceramic chip layer embedded in the overlapping layer 124 and the main bladder 122 may only extend adjacent to the taper 178 such that the second reinforcement element 166 may not be disposed between the first and second plates 172, 174 of the anchor line 126. The first reinforcement element 164 may extend adjacent to ends or the periphery 170 of each of the overlapping layer 124 and the main bladder 122. With this arrangement, the inflatable dam 120 may include the overlapping layer 124 over the main bladder 122 to substantially protect the main bladder 122 from fire and/or vandalism.

Figure 14:
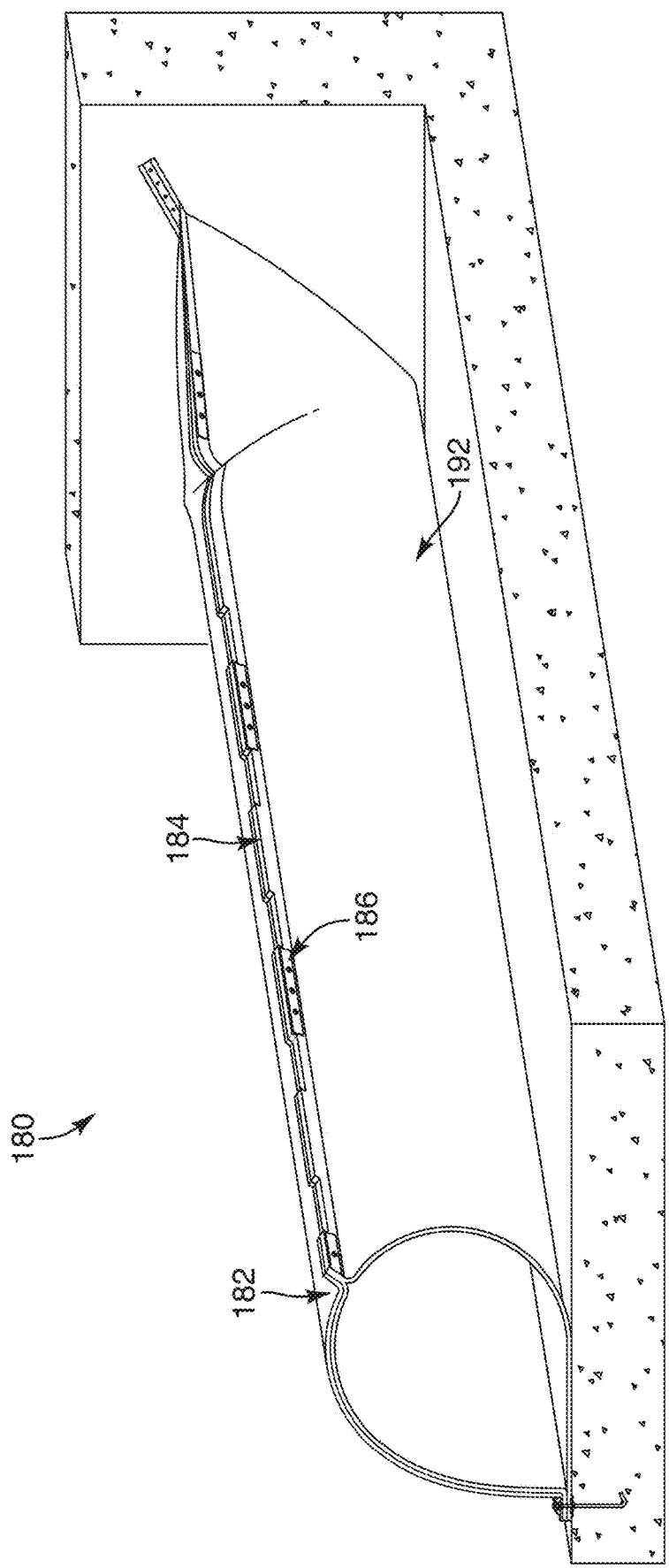
FIG. 14 is a cross-sectional perspective view of another embodiment of an inflatable dam, depicting a downstream side of the inflatable dam with an additional overlapping layer sized for coupling to an already installed inflatable dam, according to the present invention.
Figure 14A:
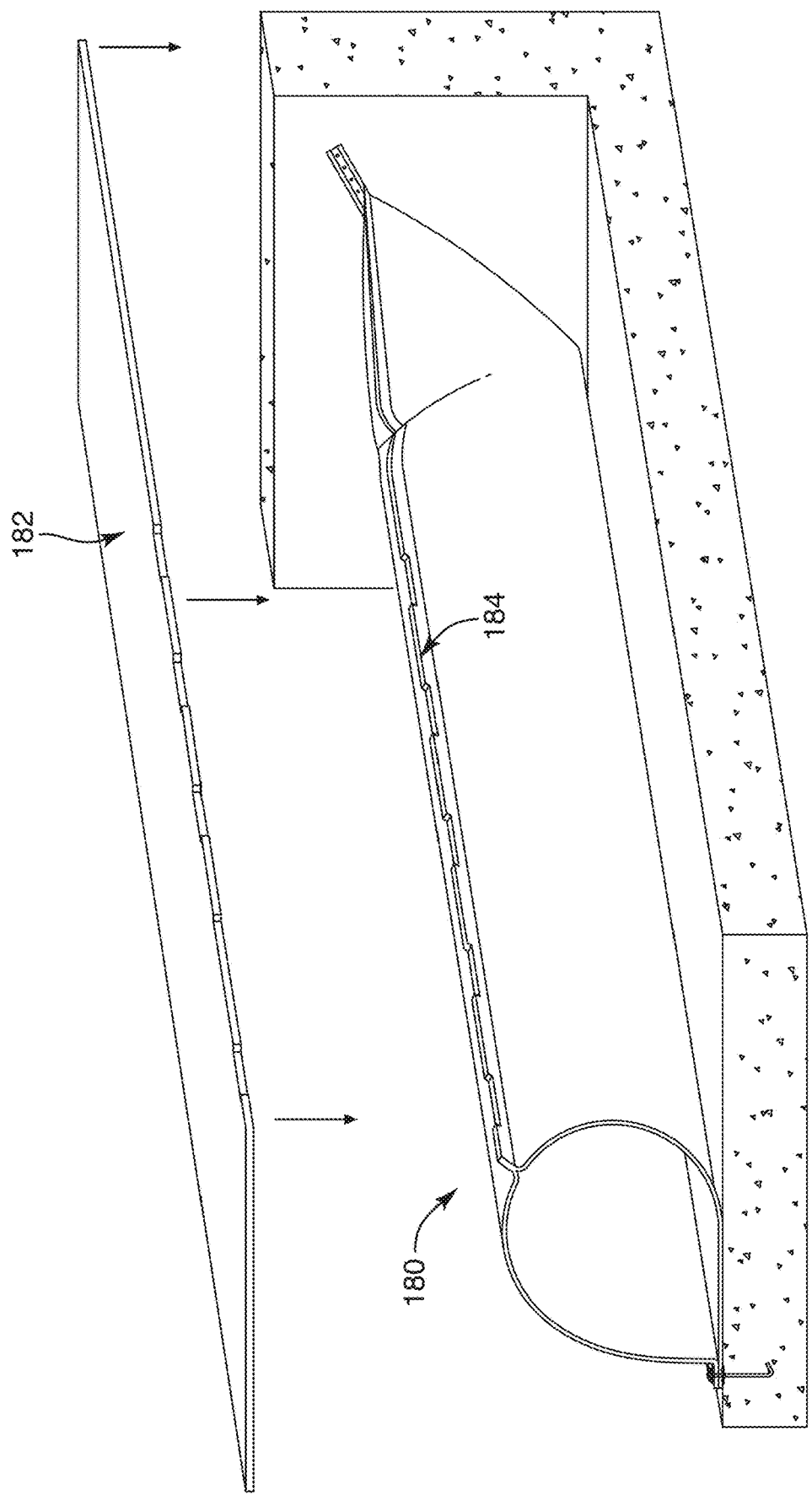
FIG. 14A is a cross-sectional perspective view of the inflatable dam, depicting the overlapping layer positioned above the inflatable dam prior to being retrofitted with the inflatable dam, according to another embodiment of the present invention.
Figure 15:
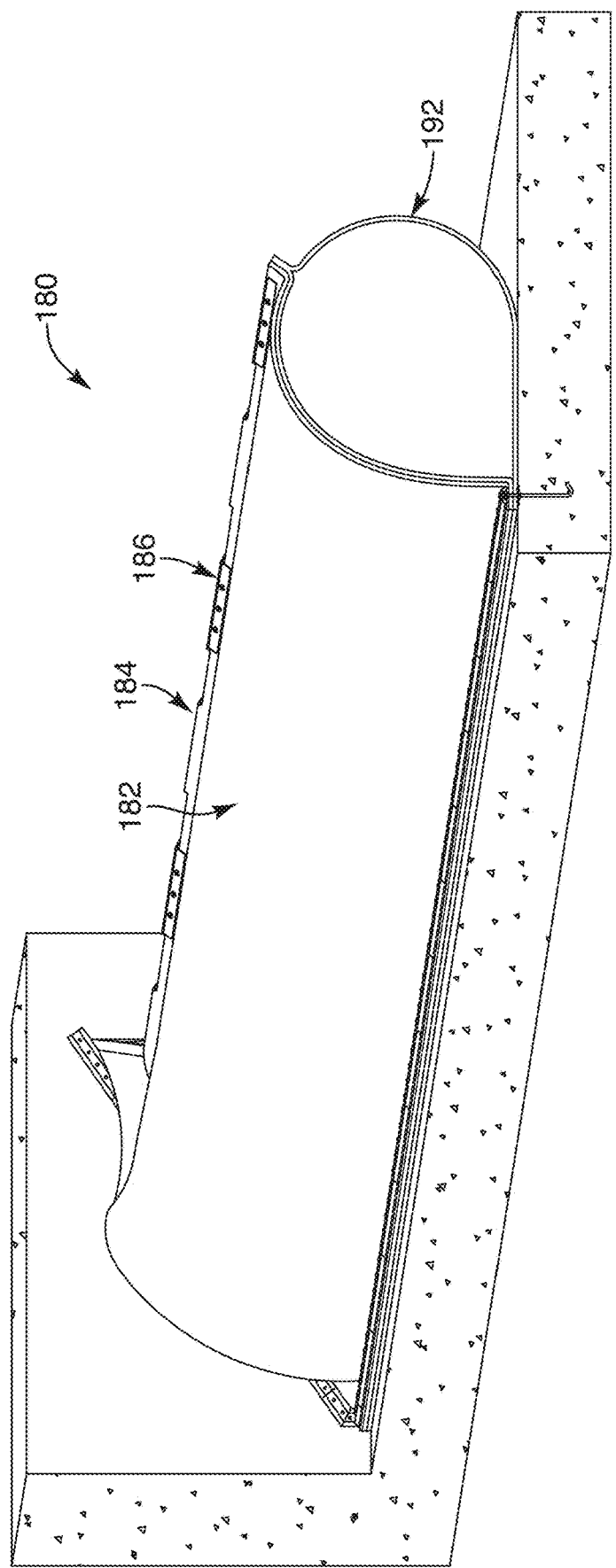
FIG. 15 is a cross-sectional perspective view of the inflatable dam of FIG. 14, depicting the additional overlapping layer along an upstream side of the inflatable dam, according to another embodiment of the present invention.

Now with reference to FIGS. 14, 14A, and 15, another embodiment for providing an overlapping layer 182 to, for example, an already installed inflatable dam 180 is provided. In this embodiment, the overlapping layer 182 may be sized similarly to the overlapping layer of the previous embodiment, except the overlapping layer 182 may not be pre-bonded to a fin structure 184 of the inflatable dam 180. Rather, the overlapping layer 182 may be coupled to the fin structure 184 with one or more clamping structures 186.

Figure 16:
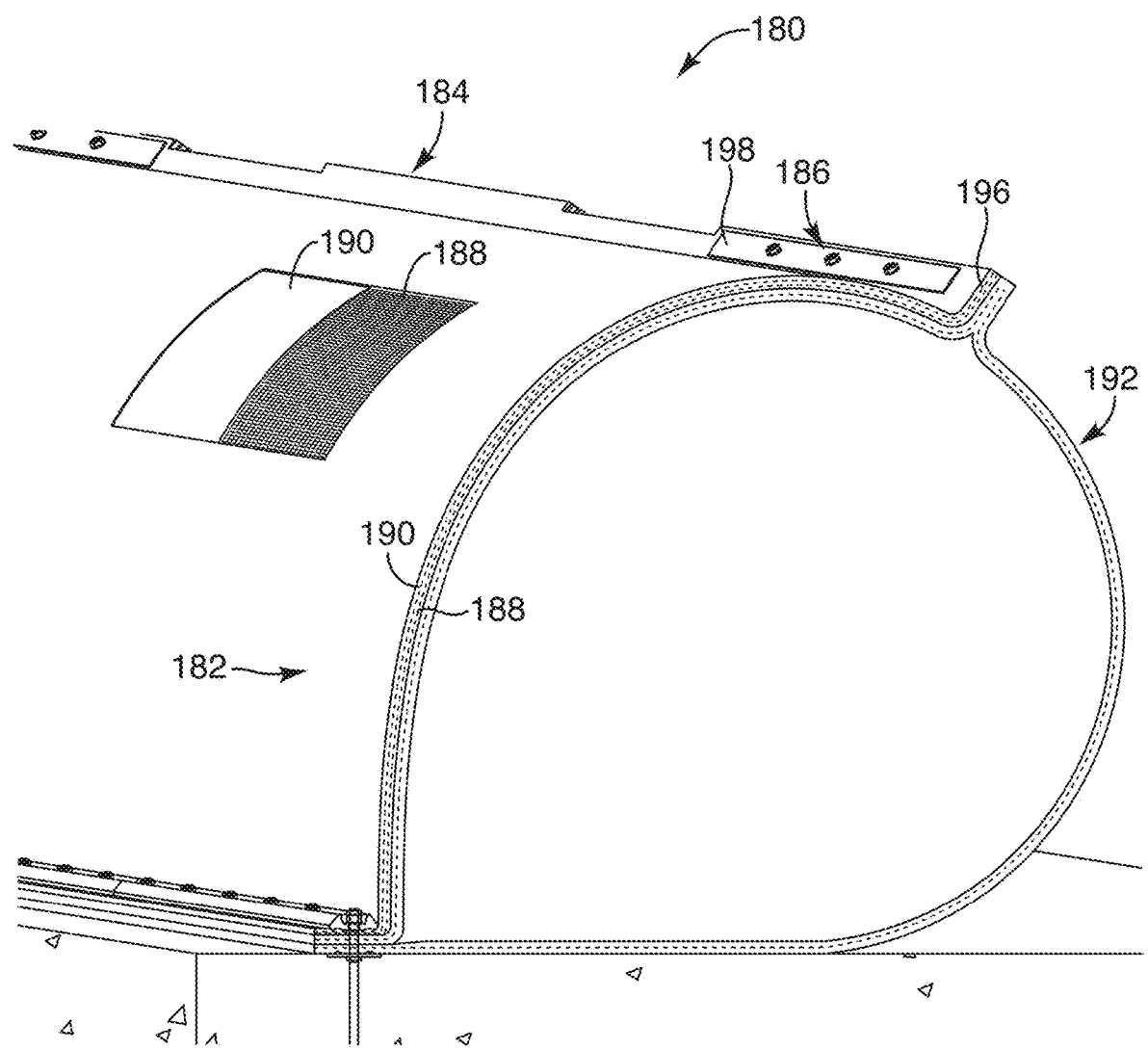
FIG. 16 is an enlarged cross-sectional perspective view of the inflatable dam of FIG. 15, depicting a cut-out portion in the additional overlapping layer, according to another embodiment of the present invention.

With respect to FIGS. 15 and 16, the overlapping layer 182 may include similar structural characteristics as the overlapping layer described and set forth in the previous embodiment. For example, the overlapping layer 182 may be a rubber layer or sheet (see FIG. 14A) with a first reinforcement element 188 and a second reinforcement element 190 each embedded within the overlapping layer 182 with structural characteristics similar to that described in the previous embodiment. With such similar structural characteristics, the overlapping layer 182 may be sized and configured to retrofit the overlapping layer 182 to an already installed and existing inflatable dam 180 such that the overlapping layer 182 may substantially protect a main bladder 192 of the inflatable dam 180 from fire and/or vandalism.

Figure 17:
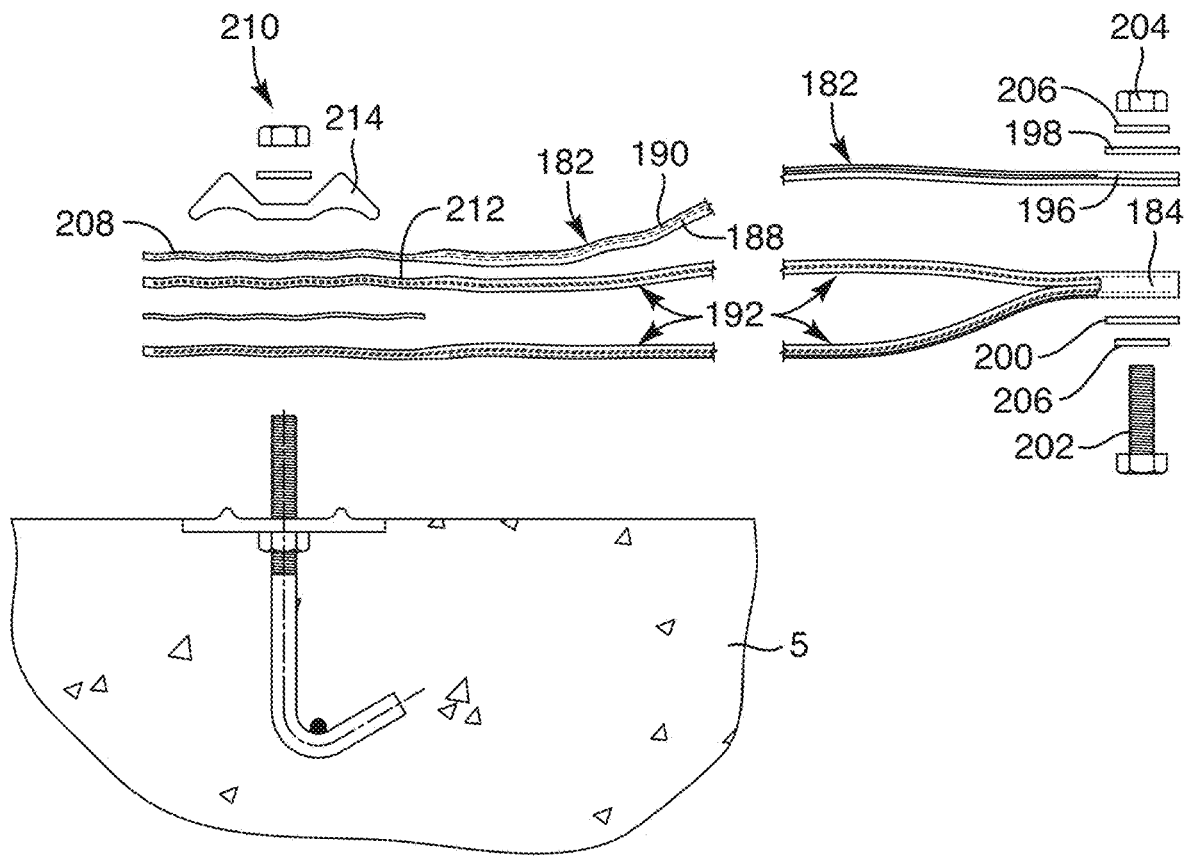
FIG. 17 an exploded side cross-sectional view of the inflatable dam, depicting various components for coupling the inflatable dam and the additional overlapping layer to a foundation structure, according to another embodiment of the present invention.

With reference to FIGS. 16 and 17, as set forth, in this embodiment, the overlapping layer 182 may be retrofitted to the inflatable dam 180 (while in the deflated state) with the one or more clamping structures 186. Such retrofitting may be employed with the inflatable dam 180 in the deflated state. The clamping structures 186 employed may be sized and configured to couple a first end portion 196 of the overlapping layer 182 to the fin structure 184 of the inflatable dam 180. The clamping structures 186 may be any suitable clamping structure and arrangement to couple the overlapping layer 182 to the inflatable dam 180.

For example, each of the one or more clamping structures 186 may include oppositely positioned first and second plates 198, 200, head bolts 202, nuts 204, and washers 206. Each of the first and second plates 198, 200 may include plate holes defined therein sized to receive the head bolts 202. Further, the first end portion 196 of the overlapping layer may include pre-drilled holes sized, positioned and aligned along the length of the first end portion 196 to position the first plates 198 therealong. Similarly, the fin structure 184 of the inflatable dam 180 may include fin holes defined therein each of which may correspond with the pre-drilled holes of the first end portion 196 of the overlapping layer 182. Such fin holes may be formed and drilled in the already existing inflatable dam 180 in preparation for retrofitting the overlapping layer 182 to the inflatable dam 180. Further, the fin holes may be configured to be positioned and aligned to correspond with the second plate 200 and the holes defined therein. With this arrangement, the first end portion 196 of the overlapping layer 182 may be positioned along the fin structure 184 of the inflatable dam 180 in preparation to couple the overlapping layer 182 to the inflatable dam 180. Once positioned, the clamping structures 186 may be secured thereto. For example, the first plate 198 may be positioned on an upper side of the first end portion 196 of the overlapping layer 182 and the second plate 200 may be positioned along an underside of the fin structure 184 so that holes defined in the first and second plates 198, 200 correspond with the respective pre-drilled holes and the fin holes defined in the respective overlapping layer 182 and the fin structure 184. One of the washers 206 may be slipped over one of the head bolts 202, and then the bolt 202 may be inserted through one of the holes of the second plate 200 and further inserted through one of the predrilled holes and one of the holes in the first plate 198. Another washer 206 may then be passed over the bolt 202 and one of the nuts 204 may be threadedly coupled to the bolt 202. Once one bolt 202 is secured to the clamping structure 186, then another bolt 202 may be similarly secured to the clamping structure 186 until one clamping structure 186 is fully secured to the overlapping layer 182 and fin structure 184 of the inflatable dam 180. This same process may continue to be employed until each clamping structure 186 is positioned and coupled to the overlapping layer 182 and the fin structure 184 of the inflatable dam 180.

Figure 18:
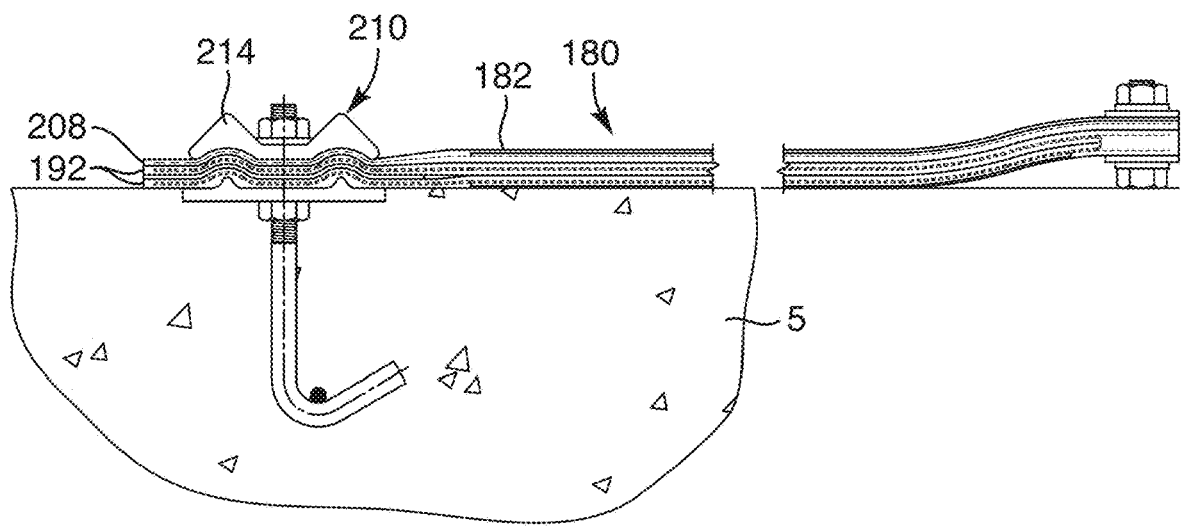
FIG. 18 is a side cross-sectional view of the inflatable dam and the overlapping layer coupled to the foundation with the various components, according to another embodiment of the present invention.

Prior to or subsequent to clamping the first end portion 196 of the overlapping layer 182 to the fin structure 184 of the inflatable dam 180, the anchor line 210 associated with of the already existing inflatable dam 180 may be loosened and removed so that a second end portion 208 of the overlapping layer 182 may be positioned over an upper end portion 212 of the main bladder 192 of the inflatable dam 180. Similar to that described herein, the anchor line 210 may then be re-secured to the foundation structure 5 with the second end portion 208 of the overlapping layer 182 positioned and coupled between an anchor plate 214 and the upper end portion 212 of the main bladder 192 of the inflatable dam 180, as depicted in FIGS. 17 and 18. In this manner, an already existing inflatable dam 180 may be retrofitted with the overlapping layer 182. The inflatable dam 180 may then be moved to an inflated state, as described herein, with the overlapping layer 182 secured to the inflatable dam 180 to provide protection from potential vandalism and fire damage as well as increased protection from the outside elements.

In another embodiment, the second end portion 208 of the overlapping layer 182 may be secured to a second anchor line (not shown) such that the second anchor line may be a new anchor line (secured to the foundation structure) positioned alongside and extending generally parallel to the already existing anchor line 210 of the inflatable dam 180. In this embodiment, the overlapping layer 182 may extend laterally longer than the overlapping layer of the previous embodiment to accommodate the second end portion 208 of the overlapping layer 182 to couple to the new second anchor line with the first end portion 192 being coupled to the fin structure 184 of the already existing inflatable dam 180, as previously set forth. In this embodiment, the anchor line 210 of the already existing inflatable dam 180 would not need to be loosened or decoupled to retrofit the overlapping layer 182 thereto.

Figure 21:
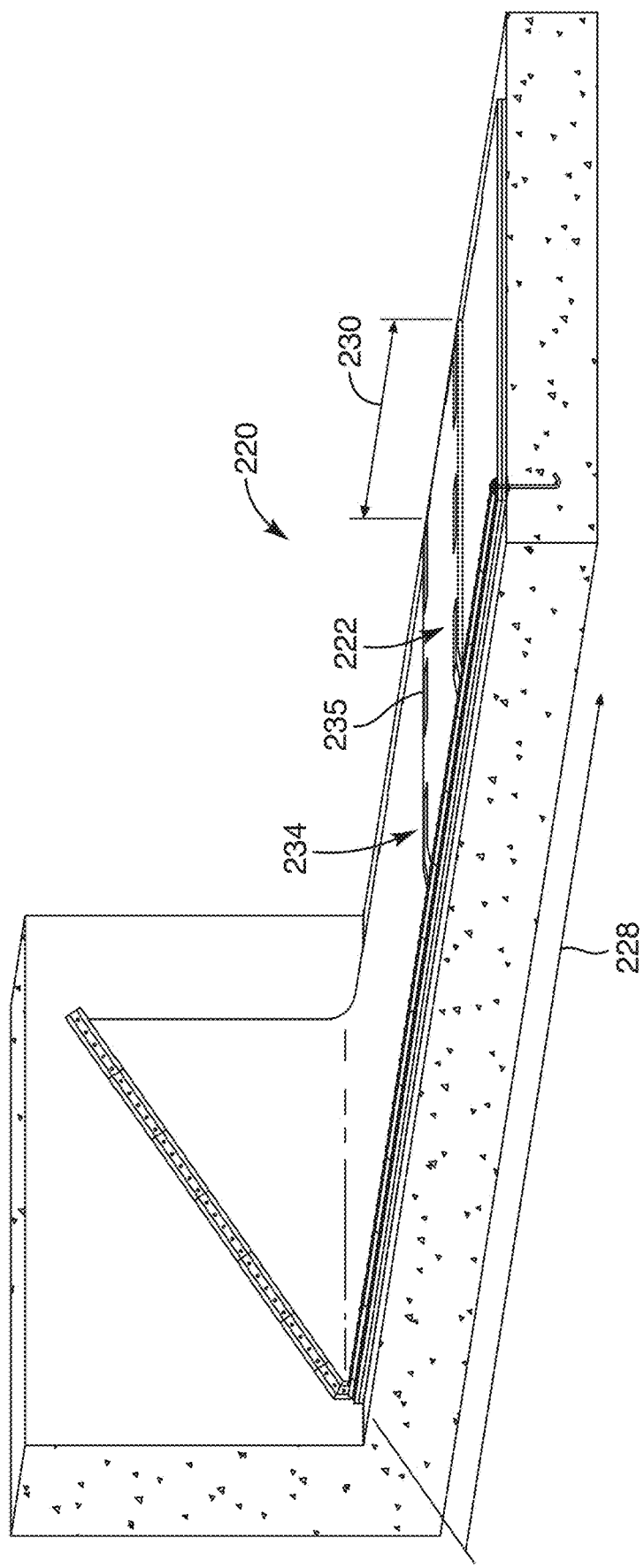
FIG. 21 is a cross-sectional perspective view of the inflatable dam of FIG. 20, depicting the inflatable dam in a deflated position, according to another embodiment of the present invention.
Figure 22:
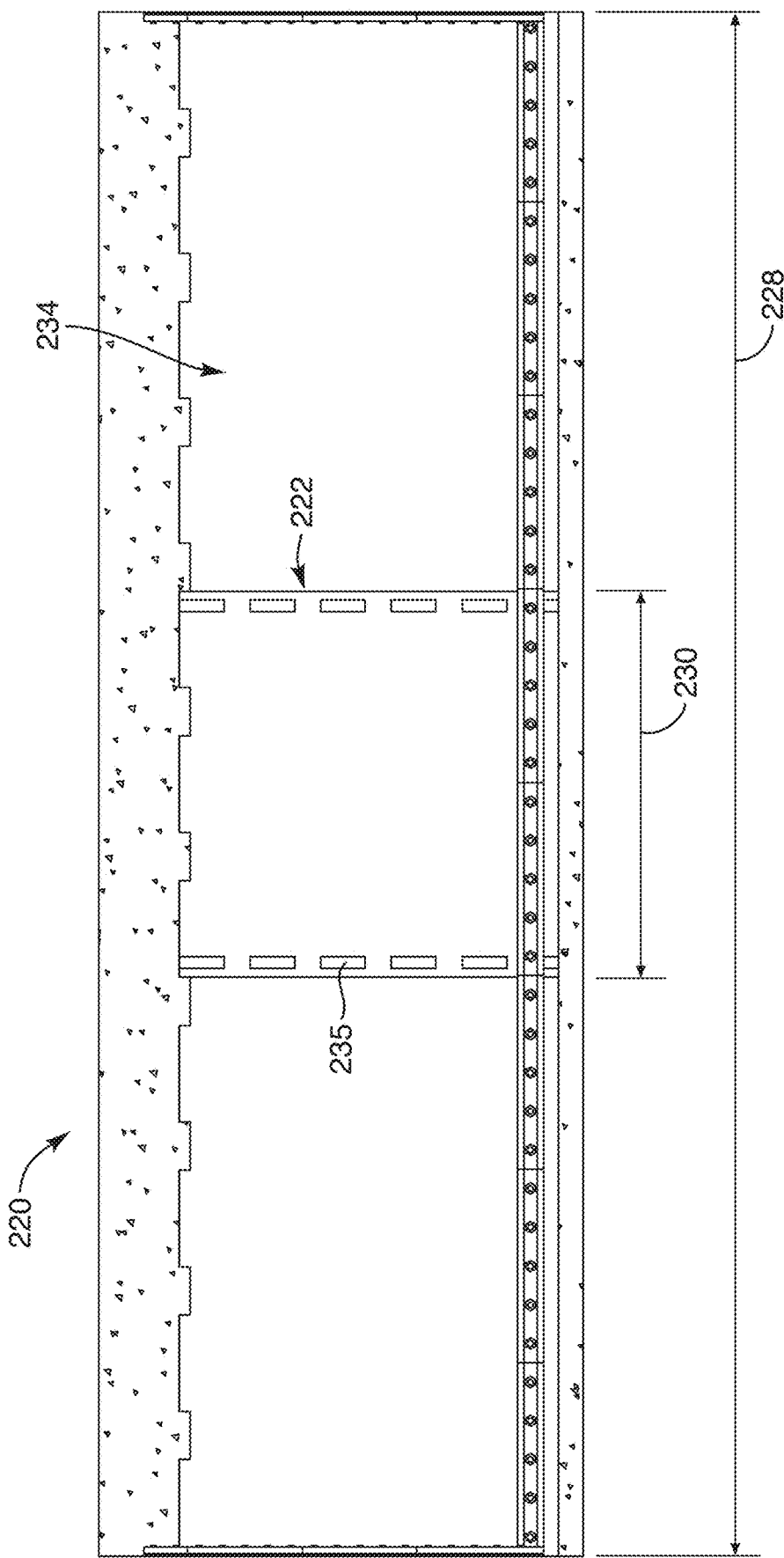
FIG. 22 is a top view of the inflatable dam of FIG. 21, depicting indicia markings in the overlapping layer, according to another embodiment of the present invention.
Figure 23:
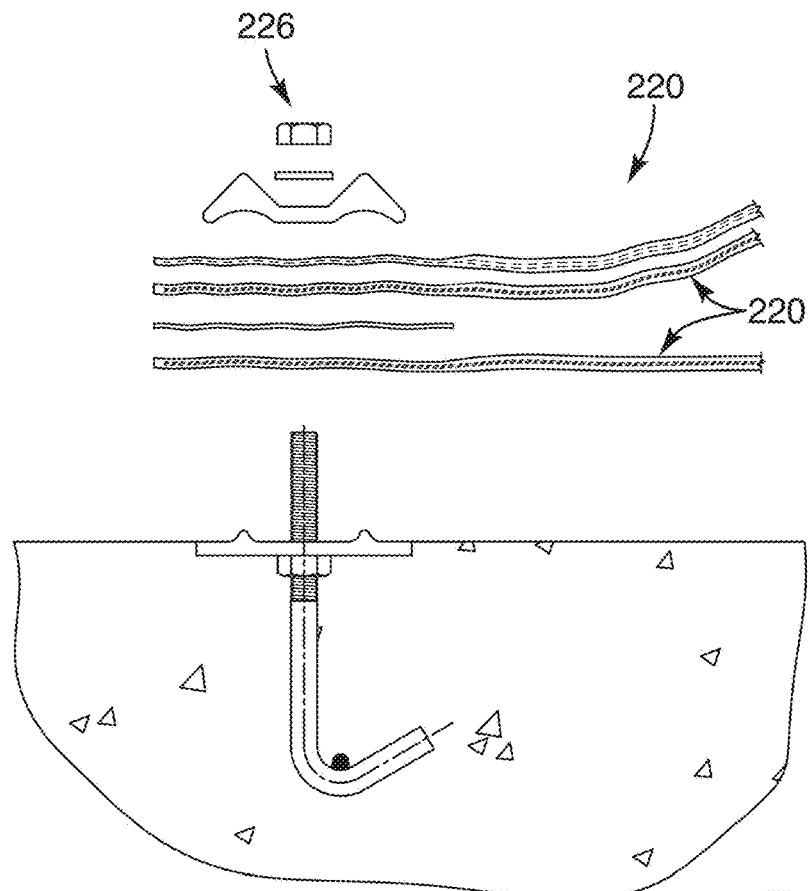
FIG. 23 is an exploded side cross-sectional view of the inflatable dam, depicting various components for coupling the inflatable dam and the overlapping layer to a foundation structure, according to another embodiment of the present invention.
Figure 24:
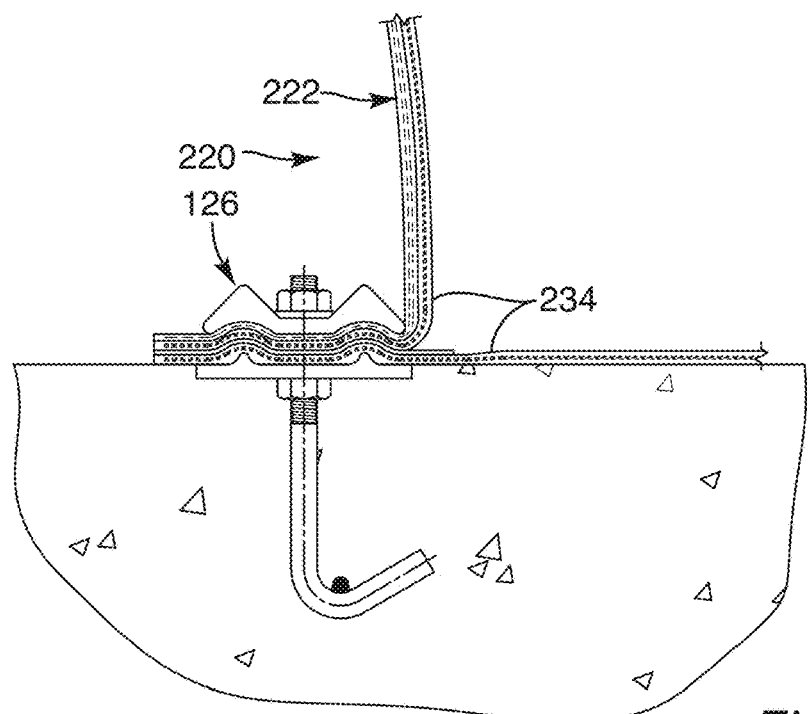
FIG. 24 is a side cross-sectional view of the inflatable dam and the overlapping layer coupled to the foundation with the various components, according to another embodiment of the present invention.

Now with reference to FIGS. 19-24, another embodiment of an inflatable dam 220 with an overlapping layer 222 positioned thereon is provided. This embodiment of the inflatable dam 220 may hold similar structural characteristics of the embodiment of FIGS. 10-13. In this embodiment, the inflatable dam 220 may include the overlapping layer 222 that may be bondedly coupled to a fin structure 224 and secured to an anchor line 226, but may not extend along an entire length 228 of the inflatable dam 220. The overlapping layer 222 of this embodiment may be sized and configured to facilitate driving over the inflatable dam 220 without incurring damage to a main bladder 234 of the inflatable dam 220. The overlapping layer 222 may include an upper layer length 230 that extends along and may be pre-bonded to the fin structure 224 of the main bladder 234 and extends laterally over a first portion 232 of the main bladder 234 to be secured with the main bladder at the anchor line, as depicted in FIGS. 23 and 24.

Figure 19:
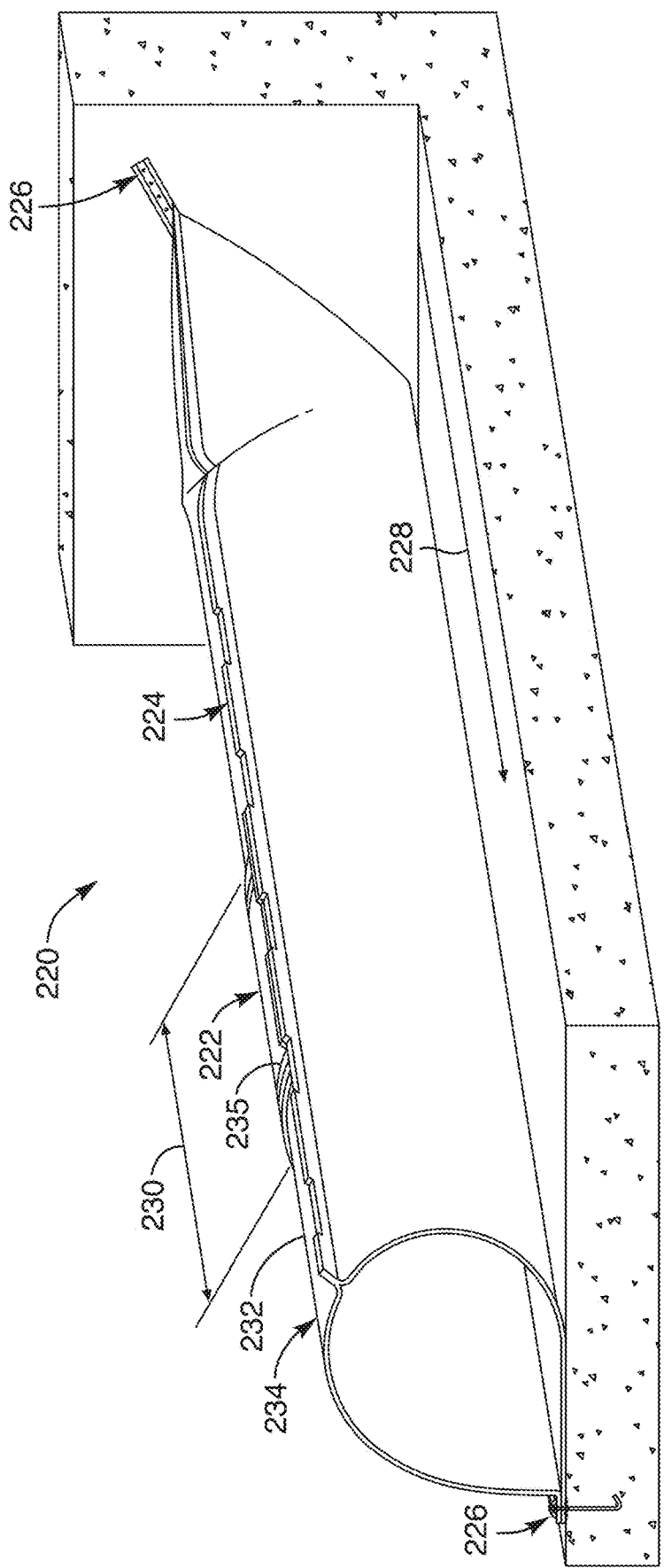
FIG. 19 is a cross-sectional perspective view of another embodiment of the inflatable dam, depicting a downstream side of the inflatable dam having an additional overlapping layer positioned over the inflatable dam, according to another embodiment of the present invention.
Figure 20:
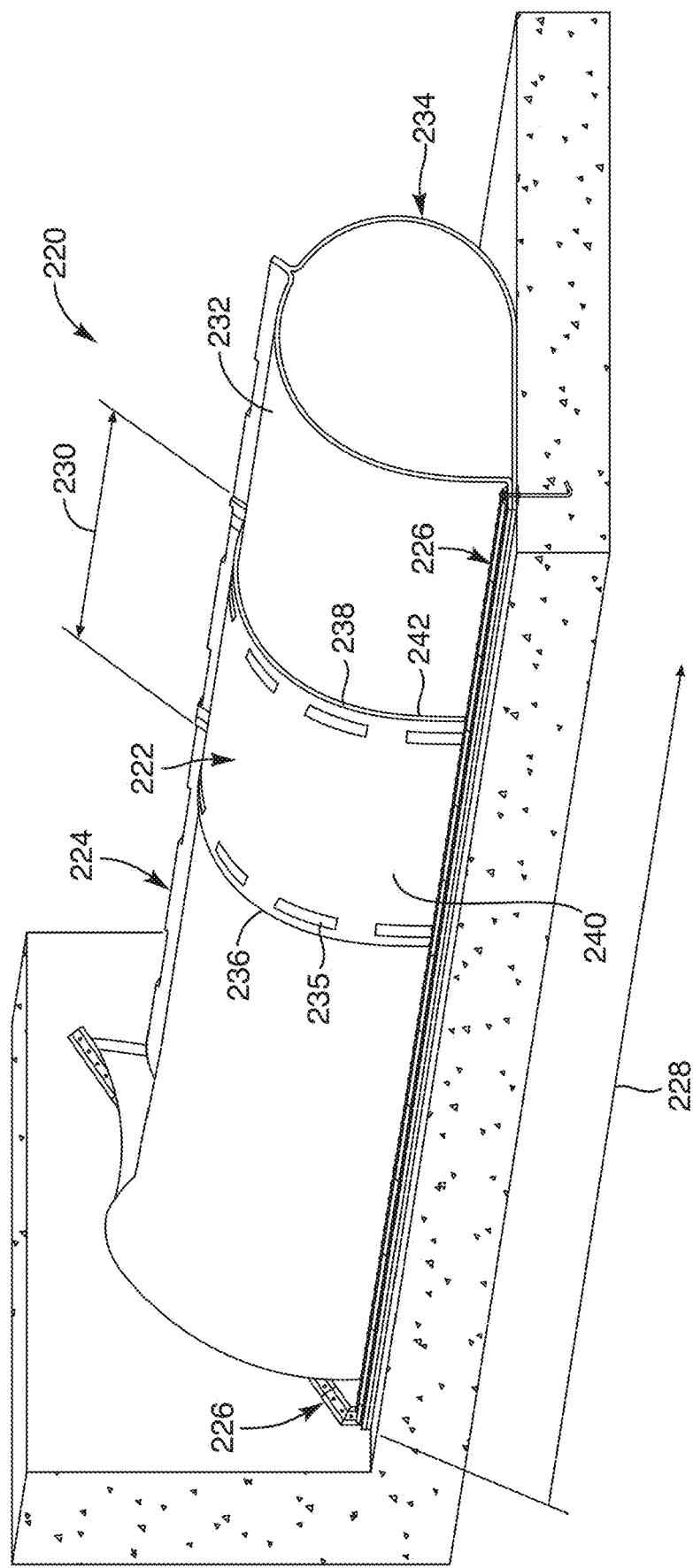
FIG. 20 is a cross-sectional perspective view of the inflatable dam of FIG. 19, depicting an upstream side of the inflatable dam having the overlapping layer positioned over the inflatable dam, according to another embodiment of the present invention.

With reference to FIGS. 19-20, the overlapping layer 222 may exhibit marking indicia 235 extending adjacent a first lateral side 236 and a second lateral side 238 of the overlapping layer 222. The marking indicia 235 may be painted on and/or etched within an external surface 240 of the overlapping layer 222. The marking indicia 235 may resemble dashed lines or a solid line extending between the anchor line 226 and the fin structure 224 so as to indicate a location that, for example, a construction worker may drive a vehicle or tractor or the like over the inflatable dam 220 without resulting in damaging the inflatable dam 220. In one embodiment, the overlapping layer 222 may be formed of a heavy reinforced rubber layer. In this manner, the overlapping layer may include a reinforcement element 242 embedded within the overlapping layer 222, similar to previous embodiments. In another embodiment, the overlapping layer 222 may include structural characteristics similar to that described in previous embodiments having the first and second reinforcement elements.

As depicted in FIGS. 21-22, the inflatable dam 220 is moved to a deflated state. In the deflated state, the overlapping layer 222 of the inflatable dam 220 of this embodiment may be employed for driving a motorized vehicle or tractor over the inflatable dam 220. In one embodiment, the overlapping layer 222 may include the upper layer length 230 of about 15 feet or more and may be positioned and bonded to the fin structure 224 anywhere along the length 228 of the main bladder 234. In this manner, the overlapping layer 222 positioned over a portion of the main bladder 234 may facilitate and allow for motorized vehicles or tractors to be driven over the inflatable dam 220, while in the deflated state, with marking indicia 235 to viewably indicate to a driver where it's safe to drive over the inflatable dam 220 without causing damage to the main bladder 234.

With reference to FIGS. 23-24, installation of the inflatable dam 220 of this embodiment may be employed with the anchor line 226. For example, the inflatable dam 220 with the main bladder 234 and the overlapping layer 222 may be secured to a foundation structure 5 with the anchor line 226, similar to the inflatable dam described and depicted in FIGS. 12 and 13. In another embodiment, the overlapping layer 222 of the inflatable dam 220 may be larger so as to be bondedly coupled along the entire length 228 or a majority of the length 228 of the fin structure 224 of the main bladder 234, similar to that depicted in FIGS. 10 and 11. In either case, the overlapping layer 222 of the inflatable dam 220 may be sized and configured to facilitate driving over the inflatable dam 220 and may also substantially protect the main bladder 234 from, for example, fire and vandalism. In another embodiment, the overlapping layer 222 may include the first and second reinforcement elements, similar to that described in previous embodiments.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. As such, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An inflatable dam for securing to a foundation with an anchor line, comprising:
    an elongated main bladder configured to be positioned along a horizontally extending foundation and between upward extending walls of the foundation, the main bladder moveable between a deflated state and an inflated state such that, in the deflated state, the elongated main bladder extends in a substantially flat configuration and, in the inflated state, the main bladder extends in a substantially tubular configuration with a fin structure extending along an upper side and along a length of the main bladder; and
    an overlapping layer sized and configured to overlap over a portion of the main bladder and, in the inflated state, concentrically aligned with the main bladder, the overlapping layer sized to extend with an overlapping length along the portion of the main bladder and to extend laterally between a first end portion and a second end portion along the overlapping length, the first end portion being coupled to the fin structure and the second end portion being configured to be coupled to the anchor line and the foundation, the overlapping layer extending as a continuous sheet between the first and second end portions of the overlapping layer.

2. The inflatable dam of claim 1, wherein the first end portion of the overlapping layer is integrally formed with the fin structure of the main bladder.

3. The inflatable dam of claim 1, wherein the first end portion of the overlapping layer is coupled to the fin structure of the main bladder with a clamp structure.

4. The inflatable dam of claim 1, wherein the overlapping layer extends with an intermediate portion between the first end portion and the second end portion along the overlapping length, the intermediate portion overlying the main bladder in a non-coupled manner.

5. The inflatable dam of claim 1, wherein the overlapping layer comprises a first reinforcement element and a second reinforcement element, each of the first and second reinforcement elements being embedded in the overlapping layer.

6. The inflatable dam of claim 5, wherein the first reinforcement element comprises a woven fabric.

7. The inflatable dam of claim 5, wherein the second reinforcement element comprises a ceramic chip layer.

8. The inflatable dam of claim 1, wherein the overlapping layer comprises a rubber material with a fire retardant or fire resistant component therein.

9. The inflatable dam of claim 1, wherein the overlapping layer comprises marking indicia visible on an external surface of the overlapping layer.

10. An inflatable dam for securing to a foundation with an anchor line, comprising:
    an elongated main bladder configured to be positioned and secured to the foundation, the elongated main bladder moveable between a deflated state and an inflated state such that, in the inflated state, the main bladder extends in a substantially tubular configuration, the elongated main bladder extending with a first portion and a second portion each with an elongated length and a width, the first portion and the second portion bondedly coupled at corresponding end portions thereof along the elongated length to form a fin structure such that, in the inflated state, the fin structure extends along the upper side of the elongated length of the main bladder; and
    an overlapping layer sized and configured to extend over the first portion of the main bladder and, in the inflated state, concentrically aligned with the first portion of the main bladder, the overlapping layer extending laterally over the first portion of the main bladder between a first end portion and a second end portion, the first end portion of the overlapping layer being coupled to the fin structure along the elongated length of the main bladder and the second end portion being configured to be coupled to the anchor line and the foundation, the overlapping layer extending as a continuous sheet along the elongated length and between the first and second end portions of the overlapping layer.

11. The inflatable dam of claim 10, wherein the first end portion of the overlapping layer is integrally formed with the fin structure of the main bladder.

12. The inflatable dam of claim 10, wherein the overlapping layer extends with an intermediate portion between the first end portion and the second end portion, the intermediate portion of the overlapping layer being a separate and discrete structure relative to the main bladder.

13. The inflatable dam of claim 10, wherein the overlapping layer comprises a first reinforcement element and a second reinforcement element, each of the first and second reinforcement elements being embedded in the overlapping layer.

14. The inflatable dam of claim 13, wherein the first reinforcement element comprises a woven fabric.

15. The inflatable dam of claim 13, wherein the second reinforcement element comprises a ceramic chip layer.

16. The inflatable dam of claim 10, wherein the overlapping layer comprises a rubber material with a fire retardant or fire resistant component therein.

17. The inflatable dam of claim 10, wherein the overlapping layer comprises marking indicia visible on an external surface of the overlapping layer.

18. A method for limiting damage to an inflatable dam secured to a foundation structure, the method comprising:
   deflating a main bladder of an inflatable dam secured to a foundation structure such that, in a deflated state, the main bladder extends substantially flat against the foundation structure, the main bladder having a fin structure extending along one side of a length of the main bladder;
   positioning an overlapping layer over an upward facing side of the main bladder, the overlapping layer having an elongated length and a width extending laterally between a first end portion and a second end portion, the overlapping layer extending as a continuous sheet along the elongated length and between the first and second end portions, the first end portion of the overlapping layer being positioned adjacent the fin structure of the main bladder;
   coupling the first end portion of the overlapping layer to the fin structure with a clamping structure; and
   coupling the second end portion of the overlapping layer to an anchor line to secure the overlapping layer to the foundation structure and to secure the overlapping layer against and over the main bladder.

19. The method according to claim 18, wherein the coupling the second end portion comprises:
   decoupling the main bladder from the anchor line; and
   coupling the second end portion of the overlapping layer to the anchor line and the main bladder such that the anchor line secures the main bladder and the overlapping layer to the foundation structure.

20. The method according to claim 18, wherein the positioning the overlapping layer comprises positioning the overlapping layer having a first reinforcement element and a second reinforcement element embedded within the overlapping layer.

* * * * *